United States Patent
Ichikawa et al.

(10) Patent No.: US 8,659,182 B2
(45) Date of Patent: Feb. 25, 2014

(54) POWER SUPPLY SYSTEM AND ELECTRIC POWERED VEHICLE INCLUDING POWER SUPPLY SYSTEM, AND METHOD FOR CONTROLLING POWER SUPPLY SYSTEM

(75) Inventors: Shinji Ichikawa, Toyota (JP); Takahide Iida, Ichinomiya (JP)

(73) Assignees: Toyota Jidosha Kabushiki Kaisha, Toyota (JP); Kabushiki Kaisha Toyota Jidoshokki, Kariya (JP)

( * ) Notice: Subject to any disclaimer, the term of this patent is extended or adjusted under 35 U.S.C. 154(b) by 604 days.

(21) Appl. No.: 12/669,939

(22) PCT Filed: Jun. 25, 2008

(86) PCT No.: PCT/JP2008/061942
§ 371 (c)(1),
(2), (4) Date: Feb. 23, 2010

(87) PCT Pub. No.: WO2009/013975
PCT Pub. Date: Jan. 29, 2009

(65) Prior Publication Data
US 2010/0181829 A1 Jul. 22, 2010

(30) Foreign Application Priority Data
Jul. 24, 2007 (JP) ................................. 2007-192021

(51) Int. Cl.
*B60L 1/00* (2006.01)
(52) U.S. Cl.
USPC ........................... 307/9.1; 307/10.1; 320/104
(58) Field of Classification Search
USPC ................................. 307/9.1, 10.1; 320/104
See application file for complete search history.

(56) References Cited

U.S. PATENT DOCUMENTS

| 6,462,511 | B1 * | 10/2002 | Kwok ............................ 320/119 |
| 6,608,396 | B2 * | 8/2003 | Downer et al. ............. 290/40 C |
| 6,741,065 | B1 | 5/2004 | Ishii et al. |
| 7,109,605 | B2 * | 9/2006 | Habu ............................... 307/39 |
| 7,683,576 | B2 * | 3/2010 | Tien et al. ..................... 320/128 |
| 2003/0081440 | A1 | 5/2003 | Komatsu et al. |
| 2003/0107352 | A1 | 6/2003 | Downer et al. |

FOREIGN PATENT DOCUMENTS

| JP | A 2001-45673 | 2/2001 |
| JP | A 2003-134606 | 5/2003 |
| JP | A 2003-209969 | 7/2003 |
| JP | A 2007-97342 | 4/2007 |
| WO | WO2007250096 * | 3/2007 |
| WO | WO 2007/037240 A1 | 4/2007 |

OTHER PUBLICATIONS

Written Opinion of the ISA issued for International Application No. PCT/JP2008/061942 on Aug. 5, 2008 (w/translation).

(Continued)

*Primary Examiner* — Jared Fureman
*Assistant Examiner* — Alfonso Perez Borroto
(74) *Attorney, Agent, or Firm* — Oliff, PLC

(57) ABSTRACT

Converters are configured to operate in a normal operation to convert the electric power that is input/output to/from secondary batteries bidirectionally to direct current voltage. In a predetermined mode allowing the secondary batteries to be charged, at least one of the converters does not perform a switching operation and holds on an upper arm element to avoid a switching loss in charging the secondary batteries. An electric power loss caused at the converters in charging the secondary batteries can be reduced, and charging efficiency can be enhanced.

24 Claims, 15 Drawing Sheets

(56) References Cited

OTHER PUBLICATIONS

Written Opinion of the IPEA issued for International Application No. PCT/JP2008/061942 on May 19, 2009 (w/translation).

International Preliminary Report on Patentability issued for International Application No. PCT/JP2008/061942 on Aug. 28, 2009 (w/translation).

International Search Report issued for International Application No. PCT/JP2008/061942 on Aug. 5, 2008.

* cited by examiner

POWER SUPPLY SYSTEM AND ELECTRIC POWERED VEHICLE INCLUDING POWER SUPPLY SYSTEM, AND METHOD FOR CONTROLLING POWER SUPPLY SYSTEM

TECHNICAL FIELD

The present invention relates generally to power supply systems and electric powered vehicles including power supply systems, and methods for controlling power supply systems, and particularly to a charge control for power storage devices in power supply systems mounted in electric powered vehicles that can use electric power stored in the power storage devices to generate a driving force of the vehicles.

BACKGROUND ART

In recent years, electric powered vehicles such as a hybrid vehicle, an electric vehicle and the like that are equipped with an electric motor as a source of force driving the vehicles to cause them to travel have been improved to increase a capacity of a power storage mechanism for improved driving performance such as enhanced acceleration performance and increased continuously travelable distance. A structure having a plurality of power storage devices arranged in parallel has been proposed as a technique for increasing the capacity of the power storage mechanism.

For example, Japanese Patent Laying-Open No, 2003-209969 (Patent Document 1) discloses a power supply control system for a motor generating vehicle driving force, including a plurality of power supply stages each configured of a set of a low voltage battery and a converter. In particular, Patent Document 1 controls a current to limit it for each power supply stage individually to balance the batteries' respective states of charge.

Furthermore, Japanese Patent Laying-open No. 2003-134606 (Patent Document 2) discloses that a single battery and a step up/down converter are combined together and thus used to control an electric motor unit to drive it and that when the battery fails or the like, the step up/down converter has its internal switch steadily turned on to ensure that the electric motor unit supplies electric power to feed an auxiliary therewith.

Generally, when a hybrid vehicle, an electric vehicle or a similar electric powered vehicle travels, and is regeneratively braked, its electric motor generates electric power, which is used to charge a power storage device to achieve increased mileage.

Furthermore in recent years there has been proposed charging an electric powered vehicle from an external power supply while the vehicle is stopped and subsequently parked. Charging a vehicle from the external power supply is done for example at night, and requires a relatively long period of time, and whether the vehicle is charged efficiently may arise a concern.

In particular, a power supply system configuration converting electric power between a power storage device and an electric motor via a converter is configured to also charge each power storage device via the converter in charging the power storage device from the external power supply, and in doing so, the converter is required to operate efficiently.

In particular, a power supply system having a plurality of power storage devices and a plurality of converters arranged in parallel, as described in Patent Document 1, requires preventing the plurality of converters from causing a loss decreasing the efficiency of charge using external power supply. However, Patent Documents 1 and 2 are silent on how in such a power supply system as described above the converters should be controlled in charging the power storage devices, from an external power supply for a long period of time in particular.

DISCLOSURE OF THE INVENTION

The present invention has been made to overcome such disadvantage, and it contemplates reducing an electric power loss of a plurality of converters to enhance a charge efficiency in charging a plurality of power storage devices in a power supply system mounted in an electric powered vehicle and having the plurality of power storage devices and the plurality of converters forming sets, respectively, and thus arranged in parallel.

The present invention provides a power supply system for an electric powered vehicle capable of generating a driving force of the electric powered vehicle from electric power supplied on an electric power line. The power supply system includes: a plurality of chargeable and dischargeable power storage devices; a plurality of converters connected between the electric power line and the plurality of power storage devices, respectively; and a control device. Each converter is configured to include a plurality of power semiconductor switching elements to convert electric power between an associated power storage device of the plurality of power storage devices and the electric power line bidirectionally. The plurality of power semiconductor switching elements include a first switching element electrically connected between the electric power line and the associated power storage device. The control device controls turning on and off each power semiconductor switching element of each converter. The control device in a predetermined mode allowing the plurality of power storage devices to be charged with electric power supplied on the electric power line selects at least a part of the plurality of power storage devices as that to be charged and also holds on the first switching element in the converter associated with the power storage device selected as that to be charged, and on the other hand holds off the first switching element in the converter associated with a remaining power storage device of the plurality of power storage devices other than that to be charged, to charge the plurality of power storage devices.

The power supply system thus allows in a predetermined mode a converter that is associated with a power storage device selected as that to be charged to have a switching element (a first switching element) held on to avoid turning on/off (or switching) the switching element and thus prevent a switching loss, and thus uses electric power on an electric power line to charge a plurality of power storage devices. Accordingly, applying the predetermined mode for example to an external charging mode consuming a relatively long period of time can reduce a converter's electric power loss and thus enhance a charge efficiency of a power storage device.

Preferably, the control device in the predetermined mode selects each of the plurality of power storage devices in parallel as those to be charged and holds on the first switching element in each converter.

This allows each power storage device to be charged in parallel while each converter does not cause a switching loss.

Still preferably, the control device in the predetermined mode has at least one of the plurality of converters control turning on/off at least one of the plurality of power semiconductor switching elements to control a voltage on the electric power line to be equivalent to a maximum voltage output from the plurality of power storage devices, and subsequently holds on the first switching element in each converter.

This can prevent an excessive rush current flowing from the electric power line into each power storage device when each converter's first switching element is turned on to start charging.

Alternatively, still preferably, if at a point in time at which the predetermined mode is entered the plurality of power storage devices have charged levels, respectively, with a difference therebetween larger than a predetermined value, the control device performs adjustment control controlling the plurality of converters to charge/discharge the plurality of power storage devices to reduce the difference to be equal to or smaller than the predetermined value, and subsequently holds on the first switching element in each converter.

This can prevent a short circuit current resulting from a difference that power storage devices have between their respective charged levels when each converter's first switching element is turned on to start charging.

Furthermore, preferably, the power supply system further includes a plurality of opening and closing devices provided between the plurality of converters and the plurality of power storage devices, respectively, and the control device in the predetermined mode selects a part of the plurality of power storage devices sequentially as that to be charged and also holds on the first switching element in the converter associated with the power storage device selected as that to be charged, and on the other hand holds off the first switching element associated with a remaining power storage device of the plurality of power storage devices other than that to be charged and also opens the opening and closing device.

Thus a plurality of power storage devices can be selected sequentially as that to be charged and the power storage device selected as that to be charged can be charged without its associated converter causing a switching loss. Furthermore, turning off an opening and closing device can physically prevent a short circuit current caused between power storage devices to be charged and uncharged, respectively, when a first switching element associated with that to be charged is turned on.

The present invention in another aspect provides a power supply system for an electric powered vehicle capable of generating a driving force of the electric power vehicle from electric power supplied on an electric power line. The power supply system includes: a plurality of chargeable and dischargeable power storage devices; a plurality of converters connected between the electric power line and the plurality of power storage devices, respectively; and a control device. Each converter is configured to include a plurality of power semiconductor switching elements to convert electric power between an associated power storage device of the plurality of power storage devices and the electric power line bidirectionally. The plurality of power semiconductor switching elements include a first switching element electrically connected between the electric power line and the associated power storage device. The control device controls turning on and off each power semiconductor switching element of each converter. The control device, in a predetermined mode allowing the plurality of power storage devices to be charged with electric power supplied on the electric power line, turns on/off at least one of the plurality of power semiconductor switching elements in the converter associated with a part of the plurality of power storage devices to control a current charged to the associated power storage device to attain a target current and on the other hand holds on the first switching element in the converter associated with a remaining power storage device of the plurality of power storage devices other than the part of the plurality of power storage devices to charge the plurality of power storage devices.

The power supply system in a predetermined mode can cause only a part of a plurality of converters to switch to control a charging current and also allows a remaining converter to have a switching element (a first switching element) held on to avoid a switching loss, and thus uses electric power on an electric power line to charge a plurality of power storage devices in parallel. This can reduce a converter's electric power loss to be smaller than when converters are switched in parallel to charge power storage devices. Accordingly, applying the predetermined mode for example to an external charging mode consuming a relatively long period of time can reduce a converter's electric power loss and thus enhance a charge efficiency of a power storage device.

Preferably, the control device sets the target current in accordance with a difference in charged level between the plurality of power storage devices.

The plurality of power storage devices can thus be charged evenly and in parallel to resolve a difference that the plurality of power storage devices have between their respective charged levels.

The present invention in still another aspect provides a power supply system for an electric powered vehicle capable of generating a driving force of the electric powered vehicle from electric power supplied on an electric power line. The power supply system includes: a plurality of chargeable and dischargeable power storage devices; a plurality of converters connected between the electric power line and the plurality of power storage devices, respectively; and a control device. Each converter is configured to include a plurality of power semiconductor switching elements to convert electric power between an associated power storage device of the plurality of power storage devices and the electric power line bidirectionally. The plurality of power semiconductor switching elements include a first switching element electrically connected between the electric power line and the associated power storage device. The control device controls turning on and off each power semiconductor switching element of each converter. The control device, in a predetermined mode allowing the plurality of power storage devices to be charged with electric power supplied on the electric power line, selects a part of the plurality of power storage devices sequentially as that to be charged and also turns on/off at least one of the plurality of power semiconductor switching elements in the converter associated with the power storage device selected as that to be charged to control a voltage on the electric power line to attain a target voltage, and on the other hand holds off the first switching element in the converter associated with a remaining power storage device of the plurality of power storage devices other than that to be charged, to charge the plurality of power storage devices.

The power supply system in a predetermined mode performs a switching operation in only a part of the converters that is associated with a power storage device selected as that to be charged to use electric power on an electric power line, to charge a plurality of power storage devices. This can reduce a converter's electric power loss to be smaller than when converters are switched in parallel to charge power storage devices. Accordingly, applying the predetermined mode for example to an external charging mode consuming a relatively long period of time can reduce a converter's electric power loss and thus enhance a charge efficiency of a power storage device.

Preferably, the control device sets the target voltage to be higher than a maximum voltage of output voltages of the plurality of power storage devices.

This can prevent an electric current flowing from a power storage device to be uncharged to a power storage device to be charged.

Furthermore, preferably, the power supply system further includes a plurality of opening and closing devices provided between the plurality of converters and the plurality of power storage devices, respectively, and the control device in the predetermined mode opens each opening and closing device associated with the power storage device other than that to be charged.

This can physically prevent an electric current flowing from a power storage device to be uncharged to a power storage device to be charged.

Still preferably, the control device is operative in response to the power storage device serving as that to be charged having been charged to a target level to switch that to be charged to select another power storage device as that to be charged, and the target level is set to allow each power storage device to be selected as that to be charged a plurality of times before each power storage device is charged to a fully charged level.

This can prevent a plurality of power storage devices from having charged levels, respectively, with a large difference therebetween if the predetermined mode ends before the power storage devices all reach a fully charged level.

Preferably in the predetermined mode the electric power line receives charging electric power originating in electric power supplied from a power supply external to the electric powered vehicle.

Thus when electric power received from an external power supply is used to charge a plurality of power storage devices an electric power loss caused at a plurality of converters can be reduced and a charge efficiency of the power storage devices can thus be enhanced.

The present invention provides an electric powered vehicle including: any of the power supply systems described above; a first alternating current rotating electric machine including a star-connected, first multiphase winding as a stator winding; a second alternating current rotating electric machine including a star-connected, second multiphase winding as a stator winding; first and second inverters; a connector unit; and an inverter control device controlling turning on and off power semiconductor switching elements of the first and second inverters. The first inverter is connected to the first multiphase winding to convert electric power between the first alternating current rotating electric machine and the electric power line. The second inverter is connected to the second multiphase winding to convert electric power between the second alternating current rotating electric machine and the electric power line. The connector unit is provided for electrically connecting a first neutral point of the first multiphase winding and a second neutral point of the second multiphase winding and an alternate current power supply external to the electric powered vehicle in the predetermined mode. At least one of the first and second alternating current rotating electric machines is employed to generate the driving force of the electric powered vehicle. The inverter control device in the predetermined mode controls each of the first and second inverters to convert alternate current voltage supplied from the alternate current power supply through the connector unit to the first and second neutral points to direct current voltage and output the direct current voltage on the electric power line.

When the electric powered vehicle employs electric power received from an external power supply to charge a plurality of power storage devices, it can reduce an electric power loss that is caused at a plurality of converters to enhance a charge efficiency of the plurality of power storage devices and can also employ first and second alternating current rotating electric machines used to generate a driving force of the vehicle and an inverter that controls the rotating electric machines to convert the electric power that is received from the external power supply to electric power charging the plurality of power storage devices without introducing additional equipment.

The present invention provides a method for controlling a power supply system for an electric powered vehicle capable of generating a driving force of the electric powered vehicle from electric power supplied on an electric power line. The power supply system includes: a plurality of chargeable and dischargeable power storage devices; a plurality of converters connected between the electric power line and the plurality of power storage devices, respectively; and a control device. Each converter is configured to include a plurality of power semiconductor switching elements to convert electric power between an associated power storage device of the plurality of power storage devices and the electric power line bidirectionally. The plurality of power semiconductor switching elements include a first switching element electrically connected between the electric power line and the associated power storage device. The control device controls turning on and off each power semiconductor switching element of each converter. The method includes the steps of: selecting at least a part of the plurality of power storage devices as that to be charged in a predetermined mode allowing the plurality of power storage devices to be charged with electric power supplied on the electric power line; and holding on the first switching element in the converter associated with the power storage device selected as that to be charged and on the other hand holding off the first switching element in the converter associated with a remaining power storage device of the plurality of power storage devices other than that to be charged, to perform a charging operation.

The method for controlling a power supply system thus allows in a predetermined mode a converter that is associated with a power storage device selected as that to be charged to have a switching element (a first switching element) held on to avoid turning on/off (or switching) the switching element and thus prevent a switching loss, and thus uses electric power on an electric power line to charge a plurality of power storage devices. Accordingly, applying the predetermined mode for example to an external charging mode consuming a relatively long period of time can reduce a converter's electric power loss and thus enhance a charge efficiency of a power storage device.

Preferably, the step of selecting selects each of the plurality of power storage devices in the predetermined mode in parallel as that to be charged, and the step of holding on holds on the first switching element in each converter.

This allows each power storage device to be charged in parallel while each converter does not cause a switching loss.

Still preferably, the method further, includes the step of having prior to the charging operation at least one of the plurality of converters control turning on/off at least one of the plurality of power semiconductor switching elements to control a voltage on the electric power line to be equivalent to a maximum voltage output from the plurality of power storage devices.

This can prevent an excessive rush current flowing from the electric power line into each power storage device when each converter's first switching element is turned on to start charging.

Alternatively, still preferably, the method further includes the step of controlling the plurality of converters to charge/discharge the plurality of power storage devices to reduce a difference that the plurality of power storage devices have between their respective charged levels prior to the charging operation that is larger than a predetermined value to be equal to or smaller than the predetermined value.

This can prevent a short circuit current resulting from a difference that power storage devices have between their respective charged levels when each converter's first switching element is turned on to start charging.

Furthermore, preferably, the power supply system further includes a plurality of opening and closing devices provided between the plurality of converters and the plurality of power storage devices, respectively. The step of selecting in the predetermined mode selects a part of the plurality of power storage devices sequentially as that to be charged, and the step of holding on holds on the first switching element in the converter associated with the power storage device selected as that to be charged, and on the other hand holds off the first switching element associated with a remaining power storage device of the plurality of power storage devices other than that to be charged and also opens the opening and closing device.

Thus a plurality of power storage devices can be selected sequentially as that to be charged and the power storage device selected as that to be charged can be charged without its associated converter causing a switching loss. Furthermore, turning off an opening and closing device can physically prevent a short circuit current caused between power storage devices to be charged and uncharged, respectively, when a first switching element associated with that to be charged is turned on.

The present invention in still another aspect provides a method for controlling a power supply system for an electric powered vehicle capable of generating a driving force of the electric powered vehicle from electric power supplied on an electric power line. The power supply system includes: a plurality of chargeable and dischargeable power storage devices; a plurality of converters connected between the electric power line and the plurality of power storage devices, respectively; and a control device. Each converter is configured to include a plurality of power semiconductor switching elements to convert electric power between an associated power storage device of the plurality of power storage devices and the electric power line bidirectionally. The plurality of power semiconductor switching elements include a first switching element electrically connected between the electric power line and the associated power storage device. The control device controls turning on and of each power semiconductor switching element of each converter. The method includes the step of: in a predetermined mode allowing the plurality of power storage devices to be charged with electric power supplied on the electric power line, turning on/off at least one of the plurality of power semiconductor switching elements in the converter associated with a part of the plurality of power storage devices to control a current charged to the associated power storage device to attain a target current and on the other hand holding on the first switching element in the converter associated with a remaining power storage device of the plurality of power storage devices other than the part of the plurality of power storage devices, to perform a charging operation.

The method for controlling a power supply system can cause in a predetermined mode only a part of a plurality of converters to perform a switching operation to control a charging current and also allows a remaining converter to have a switching element (a first switching element) held on to avoid a switching loss, and thus allows electric power on an electric power line to be used to charge a plurality of power storage devices in parallel. This can reduce a converter's electric power loss to be smaller than when converters are switched in parallel to charge power storage devices. Accordingly, applying the predetermined mode for example to an external charging mode consuming a relatively long period of time can reduce a converter's electric power loss and thus enhance a charge efficiency of a power storage device.

Preferably, the method further includes the step of setting the target current in the charging operation in accordance with a difference in charged level between the plurality of power storage devices.

The plurality of power storage devices can thus be charged evenly and in parallel to resolve a difference that the plurality of power storage devices have between their respective charged levels.

The present invention in still another aspect provides a method for controlling a power supply system for an electric powered vehicle capable of generating a driving force of the electric powered vehicle from electric power supplied on an electric power line. The power supply system includes: a plurality of chargeable and dischargeable power storage devices; a plurality of converters connected between the electric power line and the plurality of power storage devices, respectively; and a control device. Each converter is configured to include a plurality of power semiconductor switching elements to convert electric power between an associated power storage device of the plurality of power storage devices and the electric power line bidirectionally. The plurality of power semiconductor switching elements include a first switching element electrically connected between the electric power line and the associated power storage device. The control device controls turning on and off each power semiconductor switching element of each converter. The method includes the steps of: selecting a part of the plurality of power storage devices sequentially as that to be charged, in a predetermined mode allowing the plurality of power storage devices to be charged with electric power supplied on the electric power line; and turning on/off at least one of the plurality of power semiconductor switching elements in the converter associated with the power storage device selected as that to be charged to control a voltage on the electric power line to attain a target voltage, and on the other hand holding off at least the first switching element in the converter associated with a remaining power storage device of the plurality of power storage devices other than that to be charged, to perform a charging operation.

The method for controlling a power supply system switches in a predetermined mode only a part of converters that is associated with a power storage device selected as that to be charged to use electric power on an electric power line to charge a plurality of power storage devices. This can reduce a converter's electric power loss to be smaller than when converters are switched in parallel to charge power storage devices. Accordingly, applying the predetermined mode for example to an external charging mode consuming a relatively long period of time can reduce a converter's electric power loss and thus enhance a charge efficiency of a power storage device.

Preferably, the step of turning on/off sets the target voltage to be higher than a maximum voltage of output voltages of the plurality of power storage devices.

This can prevent an electric current flowing from a power storage device to be uncharged to a power storage device to be charged.

Furthermore, preferably, the power supply system further includes a plurality of opening and closing devices provided between the plurality of converters and the plurality of power storage devices, respectively, and the method further includes the step of opening the opening and closing device associated with the remaining power storage device, before the step of turning on/off.

This can physically prevent an electric current flowing from a power storage device to be uncharged to a power storage device to be charged.

Furthermore, preferably, the method further includes the steps of: detecting that the power storage device serving as that to be charged has been charged to a target level; and switching that to be charged to select another to be charged in response to detection done in the step of detecting. In the step of detecting, the target level is set to allow each power storage device to be selected as that to be charged a plurality of times before each power storage device is charged to a fully charged level.

This can prevent a plurality of power storage devices from having charged levels, respectively, with a large difference therebetween if the predetermined mode ends before the power storage devices all reach a fully charged level.

Preferably, in the predetermined mode, the electric power line receives charging electric power originating in electric power supplied from a power supply external to the electric powered vehicle.

Thus when electric power received from an external power supply is used to charge a plurality of power storage devices an electric power loss caused at a plurality of converters can be reduced and the power storage devices can thus be charged more efficiently.

Furthermore, preferably, the electric powered vehicle further includes: a first alternating current rotating electric machine including a star-connected, first multiphase winding as a stator winding; a second alternating current rotating electric machine including a star-connected, second multiphase winding as a stator winding; first and second inverters; a connector unit; and an inverter control device controlling turning on and off power semiconductor switching elements of the first and second inverters. The first inverter is connected to the first multiphase winding to convert electric power between the first alternating current rotating electric machine and the electric power line. The second inverter is connected to the second multiphase winding to convert electric power between the second alternating current rotating electric machine and the electric power line. The connector unit is provided for electrically connecting a first neutral point of the first multiphase winding and a second neutral point of the second multiphase winding and an alternate current power supply external to the electric powered vehicle in the predetermined mode. At least one of the first and second alternating current rotating electric machines is employed to generate the driving force of the electric powered vehicle. The inverter control device in the predetermined mode controls each of the first and second inverters to convert alternate current voltage supplied from the alternate current power supply through the connector unit to the first and second neutral points to direct current voltage and output the direct current voltage on the electric power line.

When the electric powered vehicle employs electric power received from an external power supply to charge a plurality of power storage devices of a power supply system, it can reduce an electric power loss that is caused at a plurality of converters to charge the plurality of power storage devices more efficiently and can also employ first and second alternating current rotating electric machines used to generate force driving the vehicle to cause it to travel and an inverter that controls the rotating electric machines to convert the electric power that is received from the external power supply to electric power charging the plurality of power storage devices without introducing additional equipment.

The present invention can thus reduce an electric power loss of a plurality of converters to enhance a charge efficiency in charging a plurality of power storage devices in a power supply system having the plurality of power storage devices and the plurality of converters forming sets, respectively, and thus arranged in parallel.

BEST MODES FOR CARRYING OUT THE INVENTION

Figure 1:
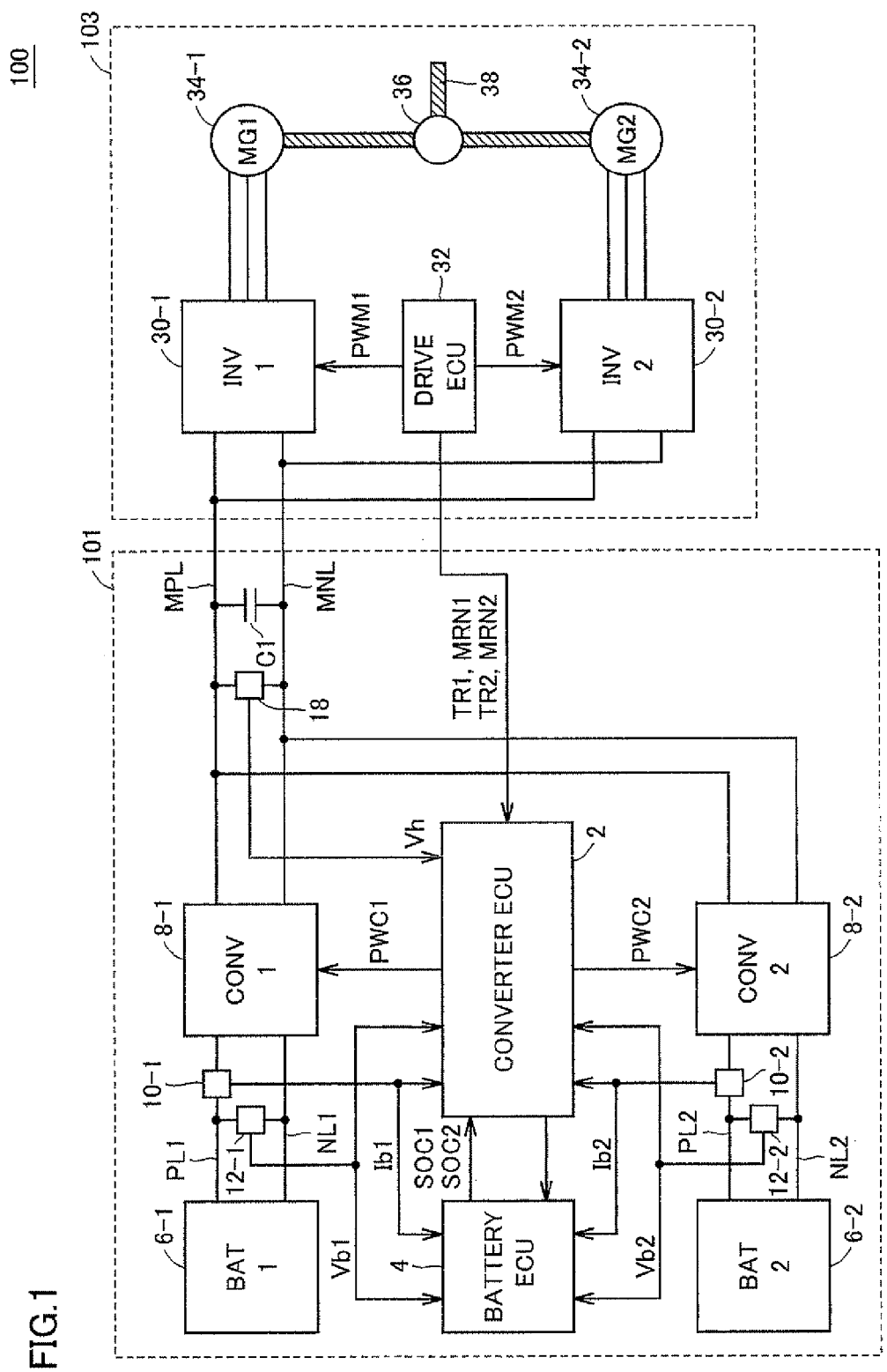
FIG. 1 is a block diagram generally showing an electric powered vehicle having a power supply system mounted therein according to an embodiment of the present invention.

Hereinafter reference will be made to the drawings to describe the present invention in embodiments. In the following description, identical or like components in the figures are denoted by identical reference characters. Accordingly, they will in principle not be described repeatedly.

First Embodiment

General Configuration of Power Supply System

FIG. 1 is a block diagram generally showing an electric powered vehicle 100 having a power supply system mounted therein according to an embodiment of the present invention.

With reference to FIG. 1, electric powered vehicle 100 includes a power supply system 101 and a driving force generation unit 103. Driving force generation unit 103 includes inverters 30-1 and 30-2, motor generators 34-1 and 34-2, a power transmission mechanism 36, and a drive electronic control unit (drive ECU) 32.

Inverters 30-1 and 30-2 are connected in parallel to a main positive bus MPL and a main negative bus MNL. Inverters 30-1 and 30-2 receive driving electric power (direct current electric power) from power supply system 101 and convert it to alternate current electric power, and output it to motor generators 34-1 and 34-2, respectively. Inverters 30-1 and 30-2 convert alternate current electric power generated by motor generators 34-1 and 34-2 to direct current electric power, and output it as regenerated electric power to power supply system 101.

As will be described hereinafter, each of inverters 30-1 and 30-2 is formed of a general three-phase inverter. Inverters 30-1 and 30-2 perform switching operations according to drive signals PWM1 and PWM2 provided from drive ECU 32, and thereby drive the corresponding motor generators, respectively.

Motor generators 34-1 and 34-2 receive alternate current electric power from inverters 30-1 and 30-2, respectively, and thereby generate rotary driving force. Motor generators 34-1 and 34-2 receive externally supplied rotary force, and thereby generate alternate current electric power. For example, each of motor generators 34-1 and 34-2 is formed of a three-phase alternate current rotating electric machine provided with a rotor having an embedded permanent magnet. Motor generators 34-1 and 34-2 are coupled to power transmission mechanism 36 for transmitting rotary driving force to wheels (not shown) via drive shaft 38 coupled to power transmission mechanism 36.

If electric powered vehicle 100 is a hybrid vehicle, motor generators 34-1 and 34-2 are also coupled to an engine (not shown) via power transmission mechanism 36 or drive shaft 38. Drive ECU 32 executes control to achieve an optimum ratio between the drive power generated by the engine and that generated by motor generators 34-1 and 34-2. Note that one of motor generators 34-1 and 34-2 may be operated exclusively as an electric motor, and the other motor generator may be operated exclusively as an electric power generator.

Drive ECU 32 calculates target torque values TR1 and TR2 and target rotation speed values MRN1 and MRN2 for motor generators 34-1 and 34-2, as based on detection signals of various sensors (not shown), a running condition, an accelerator pedal position, and the like. Generally, when motor generators 34-1 and 34-2 generate force driving the vehicle to cause it to travel, i.e., in a power running operation, target torque values TR1 and TR2 are set at positive values, whereas in a regenerative braking operation, target torque values TR1 and TR2 are set at negative values.

Drive ECU 32 then generates drive signals PWM1 and PWM2 to control inverters 30-1 and 30-2 such that the torques generated by motor generators 34-1 and 34-2 and the rotation speeds of motor generators 34-1 and 34-2 may attain target torque values TR1 and TR2 and target rotation speed values MRN1 and MRN2, respectively. Furthermore, drive ECU 32 outputs target torque values TR1 and TR2, target rotation speed values MRN1 and MRN2 thus calculated to a converter ECU 2 (described later) of power supply system 101.

Electric powered vehicle 100 is thus configured to be capable of generating a driving force of the vehicle from direct current electric power between main positive bus MPL and main negative bus MNL from power supply system 101 by at least one of motor generators 34-1 and 34-2.

Power supply system 101 includes power storage devices 6-1 and 6-2, converters 8-1 and 8-2, a smoothing capacitor C1, converter ECU 2, current sensors 10-1 and 10-2, and voltage sensors 12-1, 12-2 and 18.

Power storage device 6-1, 6-2 is typically constituted by a nickel hydrogen secondary battery or a lithium ion secondary battery, or a similar a secondary battery. Accordingly hereinafter power storage device 6-1, 6-2 will also simply be referred to as a secondary battery or a battery. Note, however, that an electric double layer capacitor or a similar power storage device other than a secondary battery is applicable in place of secondary batteries 6-1, 6-2.

Secondary battery 6-1 is connected to converter 8-1 via a positive electrode line PL1 and a negative electrode line NL1. Secondary battery 6-2 is connected to converter 8-2 via a positive electrode line PL2 and a negative electrode line NL2.

Converter 8-1 is provided between secondary battery 6-1 and main positive and negative buses MPL and MNL, and performs voltage conversion between secondary battery 6-1 and main positive and negative buses MPL and MNL, as based on a drive signal PWC1 received from converter ECU 2. Converter 8-2 is provided between secondary battery 6-2 and main positive and negative buses MPL and MNL, and performs voltage conversion between secondary battery 6-2 and main positive and negative buses MPL and MNL, as based on a drive signal PWC2 received from converter ECU 2.

Smoothing capacitor C1 is connected between main positive bus MPL and main negative bus MNL, and reduces an electric power variation component included in main positive bus MPL and main negative bus MNL. Voltage sensor 18 senses a voltage Vh across main positive bus MPL and main negative bus MNL, and provides a result of the sensing to converter ECU 2.

Current sensors 10-1 and 10-2 sense currents Ib1 and Ib2 provided to/from secondary batteries 6-1 and 6-2, respectively, and provide their respective sensed values to converter ECU 2 and battery ECU 4. Current sensors 10-1 and 10-2 sense the currents supplied from the associated secondary batteries (i.e., discharged currents) as positive values, and sense the currents supplied to the associated secondary batteries (i.e., charged currents) as negative values.

In FIG. 1, current sensors 10-1 and 10-2 sense the currents of positive electrode lines PL1 and PL2, respectively. However, current sensors 10-1 and 10-2 may sense the currents of negative electrode lines NL1 and NL2, respectively. Voltage sensors 12-1 and 12-2 sense voltages Vb1 and Vb2 of secondary batteries 6-1 and 6-2, respectively, and provide their respective sensed values to converter ECU 2 and battery ECU 4. How converter ECU 2 and battery ECU 4 operate will more specifically be described later.

Figure 2:
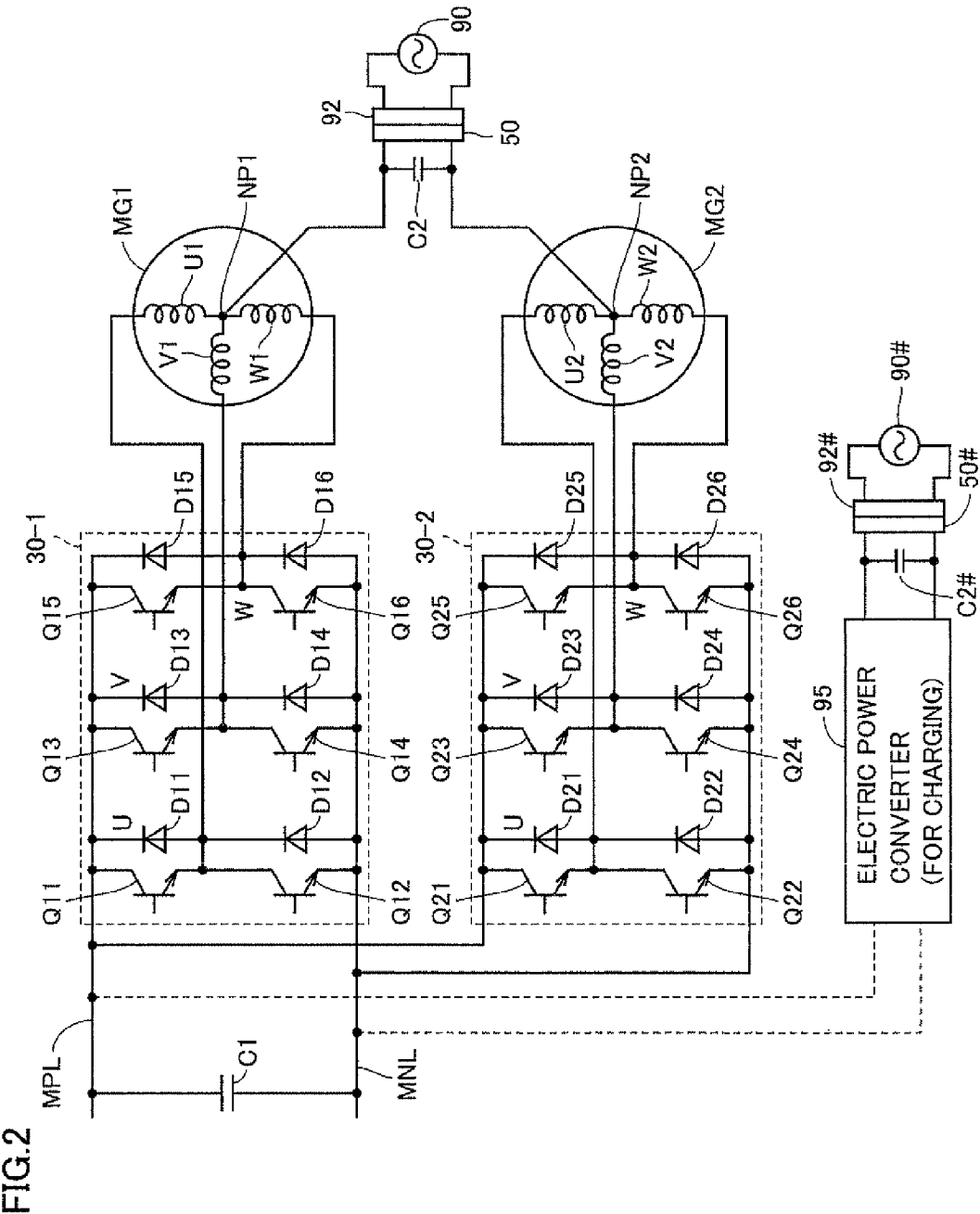
FIG. 2 is a circuit diagram specifically showing in configuration a driving force generation unit shown in FIG. 1.

FIG. 2 is a circuit diagram specifically showing how driving force generation unit 103 shown in FIG. 1 is configured.

With reference to FIG. 2, an inverter 30-1 is a typical 3-phase inverter formed of power semiconductor switching elements Q11-Q16 and anti-parallel diodes D11-D16. As the power semiconductor switching element (hereinafter simply referred to as a "semiconductor switching element"), an insulated gate bipolar transistor (IGBT) is representatively applied. However, a power metal oxide semiconductor (MOS) or a similar power switching element is also applicable. Similarly, an inverter 30-2 is a normal 3-phase inverter formed of switching elements Q21-Q26 and anti-parallel diodes D21-D26.

Inverter 30-1 has U, V and W phases connected to motor generator 34-1 at a U phase coil winding U1, a V phase coil winding V1 and a W phase coil winding W1, respectively. Similarly, inverter 30-2 has U, V and W phases connected to motor generator 34-2 at a U phase coil winding U2, a V phase coil winding V2 and a W phase coil winding W2, respectively.

Electric powered vehicle 100 further includes a connector 50 for connecting motor generator 34-1 and motor generator 34-2 at a neutral point NP1 and a neutral point NP2, respectively, to an external power supply 90, and a capacitor C2. More specifically, electric powered vehicle 100 is configured to be capable of supplying between neutral points NP1 and NP2 alternate current power supply received from external power supply 90 (representatively, a commercial power supply) connected to connector 50 by a connector 92. Capacitor C2 is provided to remove a high frequency component of alternate current voltage supplied from external power supply 90 when connector 50 and connector 92 are connected together.

Thus, while electric powered vehicle 100 is stopped, connector 50 and connector 92 can be connected together to electrically connect external power supply 90 to neutral points NP1 and NP2. In this case, the reactor components (coil windings) of motor generators 34-1, 34-2 and inverters 30-1, 30-2 constitute an electric power converter receiving alternate current voltage from external power supply 90 and converting it to direct current voltage. The direct current voltage is output between main positive bus MPL and main negative bus MNL and used to charge power storage devices 6-1, 6-2.

Alternatively, rather than a neutral point charging system as described above, inverters 30-1, 30-2 may not be used and an electric power converter 95 for externally charging the vehicle may separately be provided to receive alternate current voltage from an external power supply 90# and convert it to direct current voltage. In that case, a connector 50# and a connector 92# are connected together to connect electric powered vehicle 100 and external power supply 90# supplying alternate current voltage, which in turn has a high frequency component removed by a capacitor C2# and is then converted by electric power converter 95 to direct current voltage. Electric power converter 95 outputs the direct current voltage between main positive bus MPL and main negative bus MNL, and the direct current voltage is thus used to charge power storage devices 6-1, 6-2.

The present embodiment thus provides electric powered vehicle 100 that can charge power storage devices 6-1, 6-2 with electric power generated as it is regeneratively braked while it travels, and in addition, that can charge power storage devices 6-1, 6-2 with electric power supplied from external power supply 90, 90#. Hereinafter, a mode of operation allowing external power supply 90, 90# to charge power storage devices 6-1, 6-2 will be referred to as an "external charging mode". Generally, the external charging mode is entered for a relatively long period of time while the vehicle is parked (for example at night).

Again with reference to FIG. 1, power supply system 101 operates, as described below:

Battery ECU 4 receives values detected by voltage sensors 12-1, 12-2 and current sensors 10-1, 10-2 and therefrom estimates the charged levels of secondary batteries 6-1, 6-2. Representatively, a charged level is indicated by an amount of state represented by a state of charge (SOC). Herein, an SOC indicates a value between a fully charged level indicated as 100(%) to a completely discharged level indicated as 0(%).

For example, battery ECU 4 estimates amounts of states SOC1, SOC2 of secondary batteries 6-1, 6-2, respectively, from a cumulative value of a detected current, an open circuit voltage (OCV) estimated from a value of a detected current and that of a detected voltage, or a combination thereof, and outputs the estimated value to converter ECU 2. A temperature sensor (not shown) may be used to detect the temperatures of secondary batteries 6-1, 6-2 and the values of the detected temperatures may further be used to estimate their SOCs.

Converter ECU 2 receives various values detected by current sensors 10-1 and 10-2 and voltage sensors 12-1 and 12-2 and 18, amounts of states SOC1, SOC2 from battery ECU 4, and target torque values TR1, TR2 and target rotation speed values MRN1, MRN2 from drive ECU 32 and therefrom generates drive signals PWC1 and PWC2 for driving converters 8-1 and 8-2, respectively. Converter ECU 2 outputs drive signals PWC1 and PWC2 to converters 8-1 and 8-2 to control converters 8-1 and 8-2, respectively.

Figure 3:
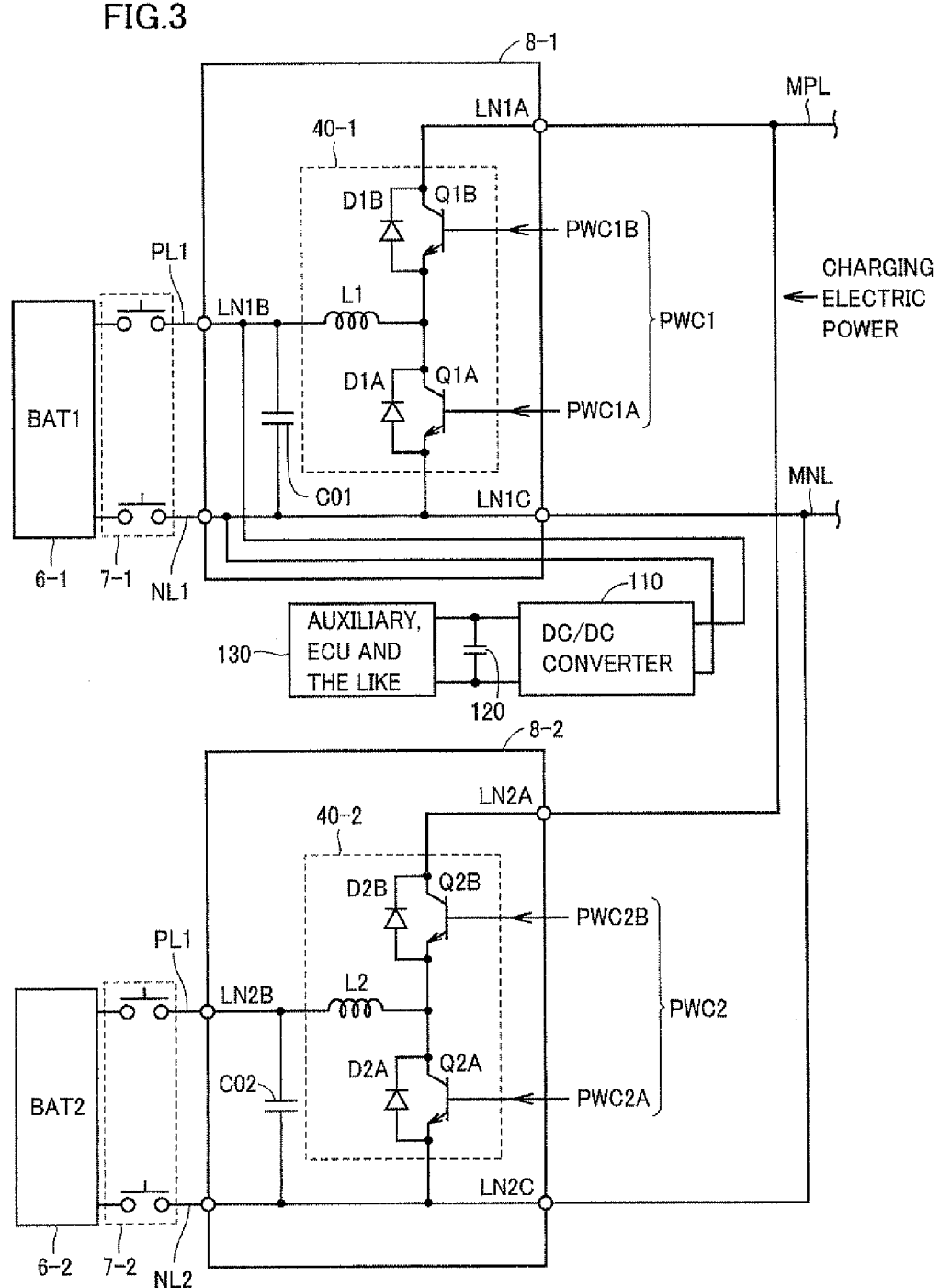
FIG. 3 is a circuit diagram for specifically illustrating the FIG. 1 power supply system in configuration.

Reference will now be made to FIG. 3 to more specifically describe how the FIG. 1 power supply system 101 is configured.

FIG. 3 is a circuit diagram for specifically illustrating how power supply system 101 according to the present embodiment, as shown in FIG. 1, is configured.

With reference to FIG. 3, converter 8-1 includes a chopper circuit 40-1, a positive bus LN1A, a negative bus LN1C, a line LN1B, and a smoothing capacitor C01. Chopper circuit 40-1 includes switching elements Q1A, Q1B, diodes D1A, D1B and an inductor L1.

Positive bus LN1A has one end connected to switching element Q1B at the collector, and the other end connected to main positive bus MPL. Furthermore, negative bus LN1C has one end connected to negative electrode line NL1 and the other end connected to main negative bus MNL.

Switching elements Q1A, Q1B are connected in series between negative bus LN1C and positive bus LN1A. More specifically, switching element Q1A has an emitter connected to negative bus LN1C and switching element Q1B has a collector connected to positive bus LN1A. Diodes D1A, D1B are connected to switching elements Q1A, Q1B, respectively, in anti-parallel. Inductor L1 is connected to a point connecting switching element Q1A and switching element Q1B together.

Line LN1B has one end connected to positive electrode line PL1 and the other end connected to inductor L1. Smoothing capacitor C1 is connected between line LN1B and negative bus LN1C to reduce an alternate current component included in direct current voltage between line LN1B and negative bus LN1C.

Chopper circuit 40-1 operates in response to drive signal PWC1 received from converter ECU 2 (FIG. 1). Basically, in discharging secondary battery 6-1, chopper circuit 40-1 receives direct current electric power (driving electric power) from positive electrode line PL1 and negative electrode line NL1 and steps it up in voltage, and in charging secondary battery 6-1, chopper circuit 40-1 receives direct current electric power (regenerated electric power) from main positive and negative buses MPL and MNL and steps it down.

Converter 8-2 includes a chopper circuit 40-2, a positive bus LN2A, a negative bus LN2C, a line LN2B, and a smoothing capacitor C02. Chopper circuit 40-2 includes switching elements Q2A, Q2B, diodes D2A, D2B, and an inductor L2. Converter 8-2 is similar in configuration and operation to converter 8-1. Accordingly it will not be described repeatedly in detail.

Furthermore, between secondary battery 6-1 and converter 8-1, a relay 7-1 is inserted in and thus connected to positive electrode line PL1 and negative electrode line NL1 to serve as an "opening and closing device". Similarly, between secondary battery 6-2 and converter 8-2, a relay 7-2 is inserted in and thus connected to positive electrode line PL2 and negative electrode line NL2 to serve as an "opening and closing device". Furthermore, a DC/DC converter 110 is connected to converter 8-1 at an input side to charge an auxiliary battery 120 used to drive a load 130 constituted for example by an auxiliary, an ECU, or the like. Generally, DC/DC converter 110 is connected to one of a plurality of converters 8-1, 8-2.

Chopper circuit 40-1 is operative in response to drive signal PWC1 received from converter ECU 2 (FIG. 1) to convert direct current voltage between secondary battery 6-1 and main positive and negative buses MPL and MNL, bidirectionally. Drive signal PWC1 includes a drive signal PWC1A controlling a lower arm element, i.e., switching element Q1A, to turn it on/off, and a drive signal PWC1B controlling an upper arm element, i.e., switching element Q1B, to turn it on/off. Within a fixed switching period (i.e., a sum of an on period and an off period) switching element Q1A and/or switching element Q113 have/has a duty ratio (an on/off period ratio), as controlled by converter ECU 2.

In a voltage step up operation, converter ECU 2 basically operates to hold upper arm element Q1B (Q2B) in the off state and also turn on/off lower arm element Q1A (Q2A) to control its duty ratio. Thus for example converter 8-1 with lower arm element Q1A in the on period receives a current discharged from secondary battery 6-1 and passes it through line LN1B, inductor L1, diode D1B, and positive bus LN1A successively to main positive bus MPL. Simultaneously from secondary battery 6-1 through line LN1B, inductor L1, lower arm element Q1A, and negative bus LN1C a pump current flows. By this pump current, inductor L1 stores electromagnetic energy. Once lower arm element Q1A has transitioned from the on state to the off state, inductor L1 superposes its stored electromagnetic energy on the discharged current. As a result, converter 8-1 supplies on main positive bus MPL and main negative bus MNL direct current electric power having an average voltage stepped up by a voltage corresponding to the electromagnetic energy stored in inductor L1 in accordance with the duty ratio. Note that for the voltage step up operation, converters 8-1, 8-2 can also be controlled to turn on upper arm element (Q1B, Q2B) while lower arm element (Q1A, Q2A) is turned off so that the upper arm element and the lower arm element complementarily and alternatingly turn on/off.

In a voltage step down operation, in contrast, converter ECU 2 basically operates to hold lower arm element Q1A (Q2A) in the off state and also turn on/off upper arm element Q1B (Q2B) to control its duty ratio. Thus for example converter 8-1 with upper arm element Q1B in the on period receives charged current from main positive bus MPL an passes it through positive bus LN1A, upper arm element Q1B, inductor L1, and line LN1B successively to secondary battery 6-1. Once upper arm element Q1B has transitioned from the on state to the off state, inductor L1 generates a magnetic flux to prevent a current from varying, and the charged current continues to flow through diode D1A, inductor L1, and line LN1B successively. On the other hand, in terms of electric energy, direct current electric power is supplied from main positive bus MPL and main negative bus MNL only when upper arm element Q1B is in the on period, and if a charged current is held at a constant value (or inductor L1 has a sufficiently large inductance), converter 8-1 will supply secondary battery 6-1 with a direct current electric power having an average voltage having a value of a direct current voltage between main positive bus MPL and main negative bus MNL that has been stepped down in accordance with the duty ratio. Note that the voltage step down operation can also be performed such that converters 8-1, 8-2 are controlled to turn on lower arm element (Q1A, Q2A) while upper arm element (Q1B, Q2B) is turned off so that the upper arm element and the lower arm element complementarily and alternatingly turn on/off.

Similarly, converter 8-2 is operative in response to drive signal PWC2 received from converter ECU 2 (FIG. 1) to convert direct current voltage between secondary battery 6-2 and main positive and negative buses MPL and MNL bidirectionally. Drive signal PWC2 includes a drive signal PWC2A controlling a lower arm element, i.e., switching element Q2A, to turn it on/of, and a drive signal PWC2B controlling an upper arm element, i.e., switching element Q2B to turn it on/off. Within a fixed switching period, switching element Q2A and/or switching element Q2B have/has a duty ratio, as controlled by converter ECU 2.

As is well known, step up/down chopper circuits 40-1, 40-2 in the voltage step up operation with lower arm elements Q1A, Q2A turned on for a period having a larger ratio emphasize the voltage step up operation and increase direct current voltage Vh between main positive bus MPL and main negative bus MNL. In the voltage step down operation, upper arm element Q1B, Q2B turned on for a period having a smaller ratio (or turned off for a period having a larger ratio) provide voltage conversion with a voltage ratio Vh/Vb1 (or Vh/Vb2) having a higher value.

In the FIGS. 1-3 configuration, main positive bus MPL and main negative bus MNL correspond in the present invention to an "electric power line". Furthermore, switching elements Q1A, Q1B, Q2A, Q2B constituting converters 8-1, 8-2 correspond in the present invention to a "plurality of switching elements", with upper arm element Q1B, Q2B corresponding in the present invention to a "first switching element". Furthermore, relays 7-1, 7-2 correspond in the present invention to an "opening and closing device".

Furthermore, converter ECU 2 corresponds in the present invention to a "control device", and drive ECU 32 corresponds in the present invention to an "inverter control device". Furthermore, inverters 30-1, 30-2 correspond in the present invention to a "first inverter" and a "second inverter", and motor generators 34-1, 34-2 correspond in the present invention to a "first alternating current rotating electric machine" and a "second alternating current rotating electric machine".

Figure 4:
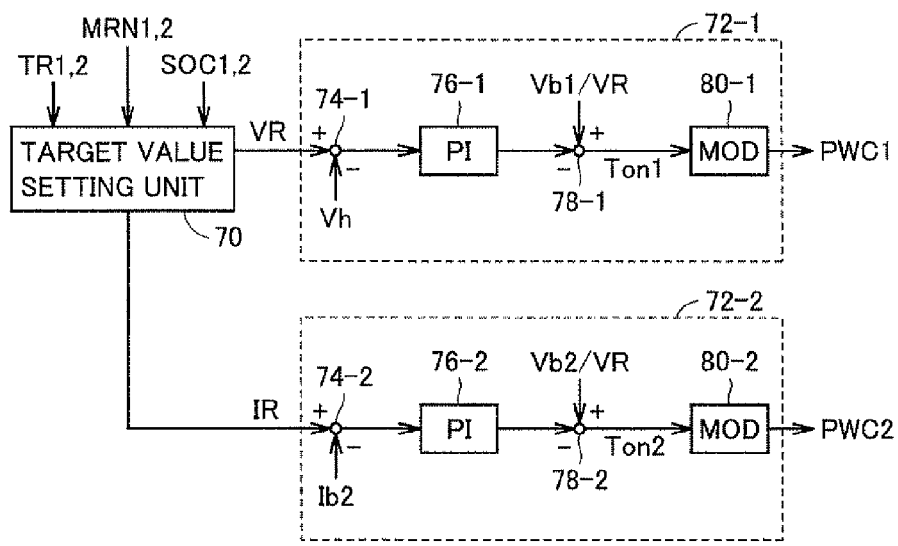
FIG. 4 is a functional block diagram for illustrating how a converter ECU controls a converter in a normal operation.

Reference will now be made to FIG. 4 to describe how converter ECU 2 controls converters 8-1, 8-2 (or chopper circuits 40-1, 40-2).

FIG. 4 is a functional block diagram for illustrating how converter ECU 2 controls converters in a normal operation.

With reference to FIG. 4, converter ECU 2 includes a target value setting unit 70, a voltage control unit 72-1, and a current control unit 72-2.

Target value setting unit 70 receives target torque values TR1, TR2 and target rotation speed values MRN1, MRN2 from drive ECU 32 and SOC1, SOC2 from battery ECU 4 and therefrom generates a target voltage VR indicating a target value for voltage Vh between main positive bus MPL and main negative bus MNL and a target current IR indicating a target value for a current charged/discharged to/from secondary battery 6-2.

Voltage control unit 72-1 includes subtraction units 74-1, 78-1, a PI control unit 76-1, and a modulation unit 80-1. Subtraction unit 74-1 subtracts voltage Vh from target voltage VR and outputs the result to PI control unit 76-1. PI control unit 76-1 receives the difference of target voltage VR and voltage Vh as an input and uses it to perform a proportional-plus-integral operation and outputs the result of the operation to subtraction unit 78-1.

Operation unit 78-1 subtracts the output of PI control unit 76-1 from a reciprocal of a theoretical voltage step up ratio of converter 8-1 indicated by voltage Vb1/target voltage VR, and outputs the result as a duty command Ton1 to modulation unit 80-1. Modulation unit 80-1 generates drive signal PWC1 based on duty command Ton1 and a carrier wave generated by an oscillation unit (not shown), and outputs the signal to converter 8-1.

Current control unit 72-2 includes subtraction units 74-2, 78-2, a PI control unit 76-2, and a modulation unit 80-2. Subtraction unit 74-2 subtracts current Ib2 from target current IR and outputs the result to PI control unit 76-2. PI control unit 76-2 receives the difference of target current IR and current Ib2 as an input and uses it to perform a proportional-plus-integral operation and outputs the result of the operation to subtraction unit 78-2.

Operation unit 78-2 subtracts the output of PI control unit 76-2 from a reciprocal of a theoretical voltage step up ratio of converter 8-2 indicated by voltage Vb2/target voltage VR and outputs the result as a duty command Ton2 to modulation unit 80-2. Modulation unit 80-2 generates drive signal PWC2 based on duty command Ton2 and a carrier wave generated by an oscillation unit (not shown), and outputs the signal to converter 8-2.

If direct current voltage Vh is lower than target voltage VR and the reciprocal of the theoretical voltage step up ratio (Vb1/VR) is decreased, voltage control unit 72-1 generates drive signal PWC1 to allow lower arm element Q1A to be turned on for a period having an increased ratio (or allow upper arm element Q1B to be turned off for a period having an increased ratio).

On the other hand, if secondary battery 6-2 outputs current Ib2 smaller than target current IR and the reciprocal of the theoretical voltage step up ratio (Vb2/VR) is increased, current control unit 72-2 generates drive signal PWC2 to allow lower arm element Q2A to be turned on for a period having an increased ratio.

Note that when secondary battery 6-2 is charged, i.e., target current IR is set at a negative value (IR<0), and current Ib2 is lower than target current IR (Ib2<0) (|IR|<|Ib2|, i.e., the battery is charged with an excessively large current), current control unit 72-2 generates drive signal PWC2 to allow upper arm element Q2B to be turned on for a period having a reduced ratio. In contrast, when the battery is charged with an insufficient current (IR<Ib2, i.e., when |IR|>|Ib2|), drive signal PWC2 is generated to allow upper arm element Q2B to be turned on for a period having an increased ratio.

When motor generators 34-1 and/or 34-2 perform/performs a power running operation and a regenerative braking operation, target value setting unit 70 sets target voltage VR in accordance with target torque values TR1, TR2 and target rotation speed values MRN1, MRN2 for motor generators 34-1, 34-2 to allow direct current voltage Vh to achieve an appropriate level. Furthermore, target value setting unit 70 sets target current IR taking into consideration that secondary batteries 6-1, 6-2 have their respective charged levels (or SOCs) in balance.

Power supply system 101, in the normal operation, has upper arm element Q1B and/or upper arm element Q2B and lower arm element Q1A and/or lower arm element Q2A switched (turned on/off) to achieve a voltage control by converter 8-1 and a current control by converter 8-2, to control direct current voltage Vh and a balance of charge and discharge between secondary batteries 6-1 and 6-2.

Thus in the power running operation an electric power conversion operation is performed to convert the electric power that is discharged from secondary batteries 6-1, 6-2 to a voltage input to driving force generation unit 103, or voltage Vh, and output the voltage between main positive bus MPL and main negative bus MNL. In the regenerative braking operation and the external charging mode, in contrast, power supply system 101 performs an electric power conversion operation to charge secondary batteries 6-1, 6-2 with charging electric power received on main positive bus MPL and main negative bus MNL.

When converters 8-1, 8-2 both have their upper arm elements and/or lower arm elements switched, however, converters 8-1, 8-2 would both cause a switching loss, and if a vehicle is charged in the external charging mode or similarly done so for a long period of time, converters 8-1, 8-2 may cause a switching loss decreasing an efficiency.

Accordingly hereinafter will be described a control operation in an "efficient charging mode" of converters 8-1, 8-2 suitable for the external charging mode or similarly charging continuously for a long period of time. The efficient charging mode corresponds in the present invention to a "predetermined mode".

While the below described efficient charging mode is basically applied in the external charging mode, the efficient charging mode may be applied when a vehicle travels on a gentle downhill for a long period of time or similarly a predetermined condition is established while the vehicle is traveling.

Efficient Charging Mode of Converter

Figure 5:
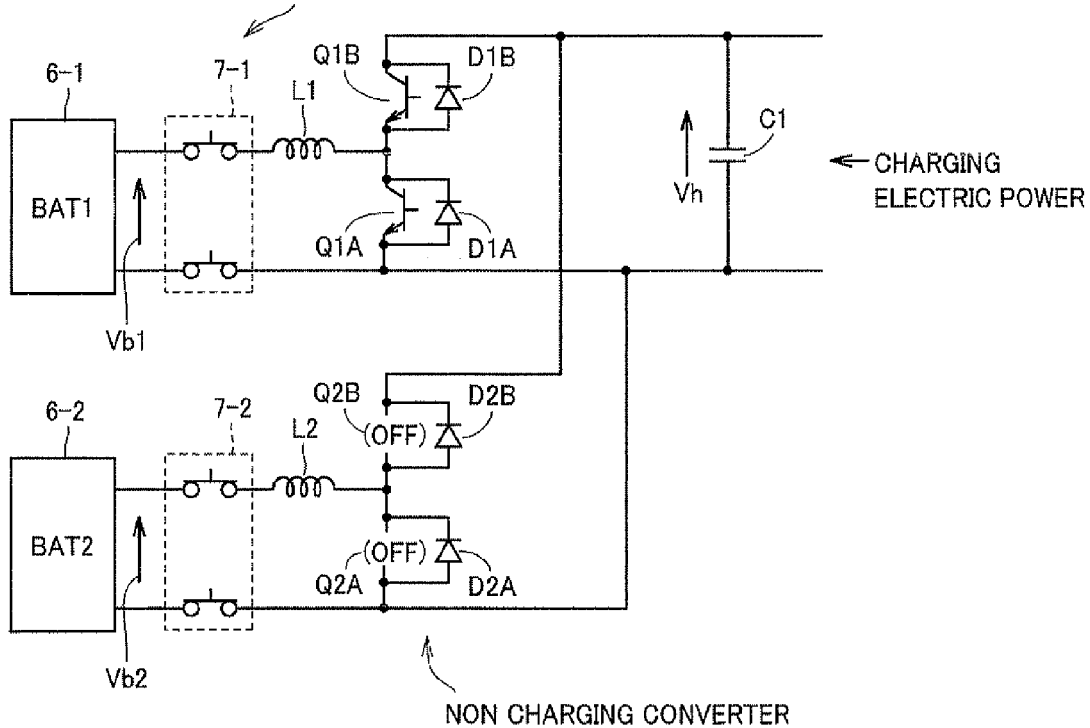
FIG. 5 is a conceptual diagram for illustrating how a converter is controlled in the power supply system according to a first embodiment in an efficient charging mode.

FIG. 5 is a conceptual diagram for illustrating how a converter is controlled in the power supply system in an efficient charging mode according to the first embodiment of the present invention.

With reference to FIG. 5, the power supply system of the first embodiment in the efficient charging mode has one (or a part) of the plurality of secondary batteries 6-1, 6-2 selected as that to be charged, and the secondary battery other than that to be charged is set as that to be uncharged.

A converter associated with the secondary battery (or power storage device) to be charged (i.e., a charging converter) charges the associated secondary battery (or power storage device) with charging electric power between main positive bus MPL and main negative bus MNL through controlling a voltage, as has been described with reference to FIG. 4. In contrast, a converter associated with the secondary battery (or power storage device) to be uncharged (i.e., a non charging converter) has its gate turned off to have its upper and lower arm elements both held off.

In the FIG. 5 example, secondary battery 6-1 is selected as that to be charged, and its associated converter 8-1 (a charging converter) controls voltage to control direct current voltage Vh to be target voltage VR, and while upper arm element Q1B is in the on period, secondary battery 6-1 is charged. In contrast, converter 8-2 (a non charging converter) associated with secondary battery 6-2 to be uncharged has upper arm element Q2B and lower arm element Q2A both held off.

As will be described later, in the power supply system of the first embodiment, once a secondary battery (or power storage device) selected as that to be charged has been charged to a target level, the secondary battery (or power storage device) to be charged is switched to another to be charged. A converter associated with that secondary battery (or power storage device) now selected as that to be charged now serves as a charging converter for charging the secondary battery (or power storage device) similarly through controlling a voltage. In other words, a power supply system including two secondary batteries 6-1, 6-2 will have secondary batteries 6-1, 6-2 selected alternately as that to be charged.

Figure 6:
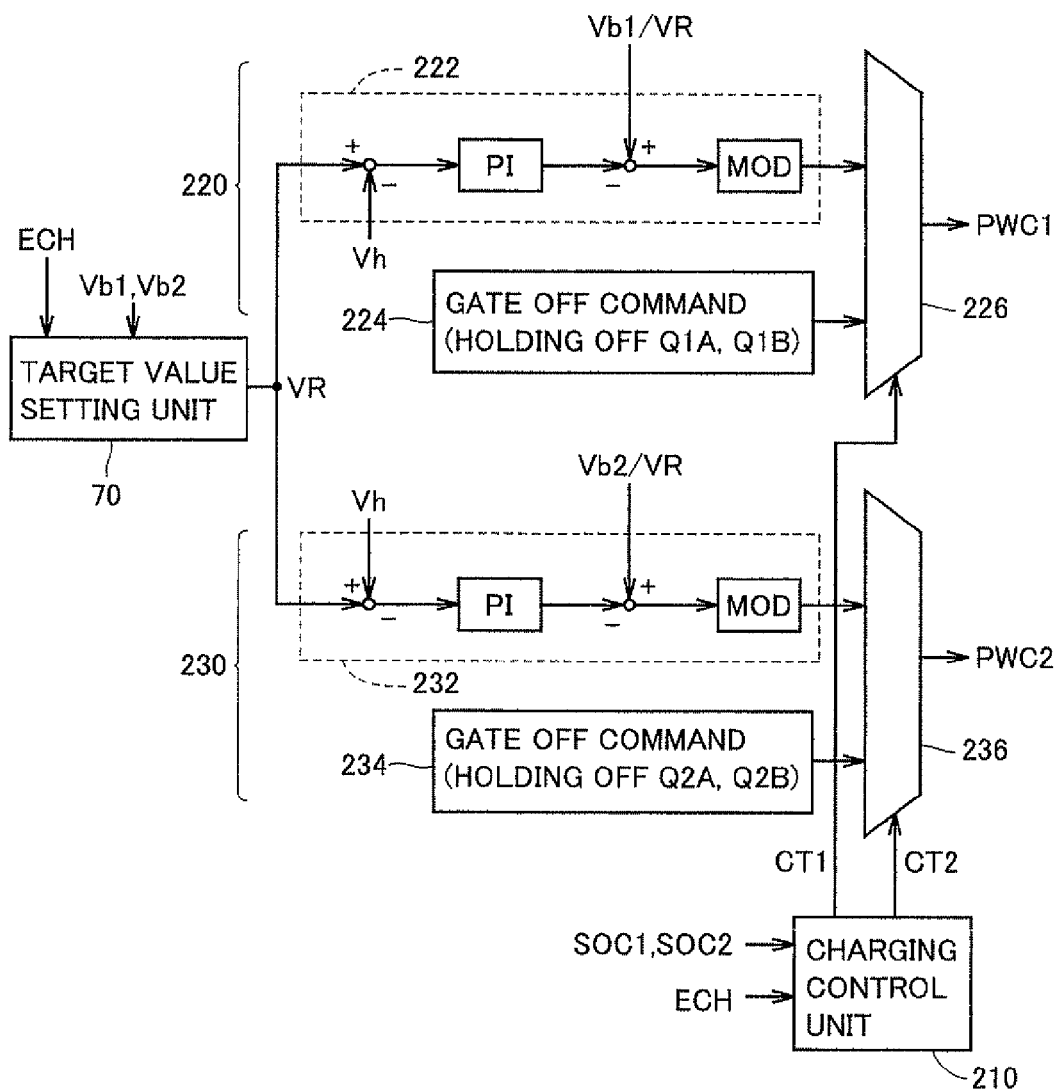
FIG. 6 is a functional block diagram for illustrating how a converter is controlled in the power supply system according to the first embodiment in the efficient charging mode.

FIG. 6 is a functional block diagram for illustrating how a converter is controlled in the power supply system according to the first embodiment in the efficient charging mode.

With reference to FIG. 6, a charging control unit 210 receives a mode signal ECH indicating the efficient charging mode and amounts of states SOC1, SOC2 of secondary batteries 6-1, 6-2 and therefrom generates control signals CT1, CT2 for selecting which secondary battery to be charged. Control signal CT1 is turned on when secondary battery 6-1 is to be charged, and control signal CT1 is turned off when secondary battery 6-1 is to be uncharged. Similarly, control signal CT2 is turned on when secondary battery 6-2 is to be charged, and control signal CT2 is turned off when secondary battery 6-2 is to be uncharged.

A control unit 220 for controlling converter 8-1 for charging includes a voltage control unit 222 configured to be similar to voltage control unit 72-1 (FIG. 4), and a gate off command unit 224 for holding off switching elements Q1A, Q1B. Similarly, a control unit 230 for controlling converter 8-2 includes a voltage control unit 232 configured to be similar to voltage control unit 72-1 (FIG. 4), and a gate off command unit 234 for holding off switching elements Q2A, Q2B.

In the efficient charging mode, target value setting unit 70 sets target voltage VR at a voltage higher than a maximum value of voltages Vb1, Vb2 of secondary batteries 6-1, 6-2 for controlling voltage. In other words, VR=Max (Vb1, Vb2)+α is set, wherein α is a margin value. Target voltage VR is thus set to be higher than any of voltages Vb1, Vb2. This can prevent secondary batteries 6-1, 6-2 from having a current path formed therebetween via an anti-parallel diode (D1B or D2B) connected to an upper arm element (held off) of a non charging converter.

Voltage control unit 222 outputs a drive signal for switching converter 8-1 to control voltage Vh to be target voltage VR, and voltage control unit 232 outputs a drive signal for switching converter 8-2 to control voltage Vh to be target voltage VR. Gate off command units 224 and 234 output a drive signal for holding off switching elements Q1A, Q1B, and a drive signal for holding off switching elements Q2A, Q2B, respectively.

A selector 226 receives drive signals from voltage control unit 222 and gate off command unit 224, respectively. It is operative in response to control signal CT1 turned on to generate the drive signal that is received from voltage control unit 222 as drive signal PWC1, and is operative in response to control signal CT1 turned of to output the drive signal that is received from gate off command unit 224 as drive signal PWC1. Similarly, a selector 236 receives drive signals from voltage control unit 232 and gate off command unit 234, respectively. It is operative in response to control signal CT2 turned on to generate the drive signal that is received from voltage control unit 232 as drive signal PWC2, and is operative in response to control signal CT2 turned off to output the drive signal that is received from gate off command unit 234 as drive signal PWC2.

Thus, as shown in FIG. 5, a charging converter associated with a secondary battery selected as that to be charged has at least an upper arm element (Q1B, Q2B) switched to control voltage in accordance with target voltage VR, whereas a non charging converter has its upper and lower arm elements held off.

Hereinafter Reference will be made to FIG. 7 to describe a flow of a process of a charging operation in the power supply system of the first embodiment in the efficient charging mode. The FIG. 7 flowchart is implemented for example by executing a predetermined program previously stored in converter ECU 2.

Figure 7:
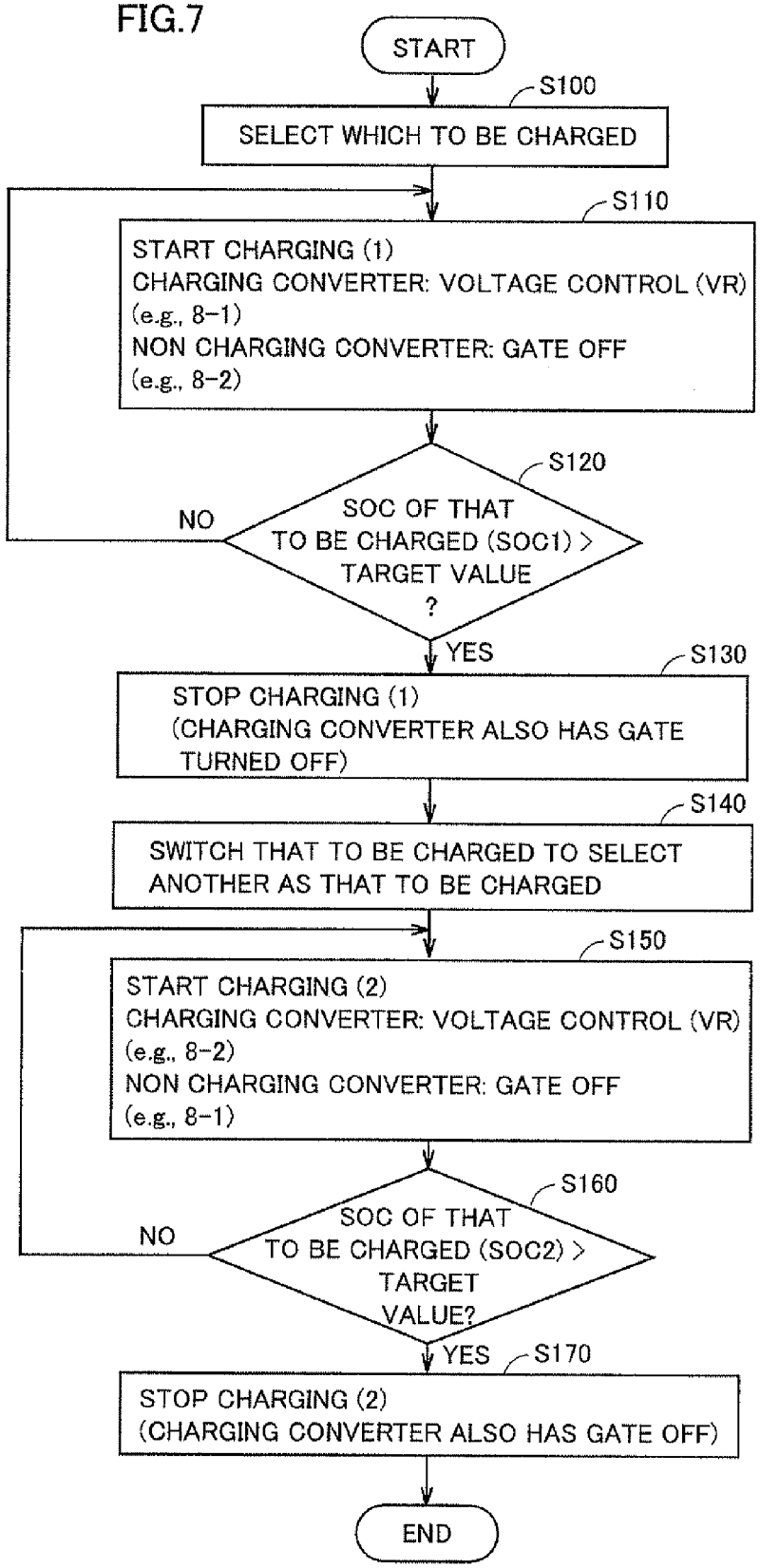
FIG. 7 is a flowchart for illustrating a series of operations in the power supply system according to the first embodiment in the efficient charging mode.

With reference to FIG. 7, converter ECU 2 in step S100 selects which secondary battery should be charged. For example, which secondary battery should be charged is determined from voltages Vb1, Vb2 of secondary batteries 6-1, 6-2. Alternatively, as has been shown in FIG. 3, if one secondary battery 6-1 has auxiliary battery 120 connected thereto, it is preferable that the secondary battery (or power storage device) having the auxiliary battery connected thereto be preferentially selected as that to be charged.

Converter ECU 2 in step S110 starts an operation charging the secondary battery (or power storage device) selected in step S100 as that to be charged. For example, if secondary battery 6-1 is selected as that to be charged and secondary battery 6-2 is selected as that to be uncharged, then, as has been described above, a charging converter, or converter 8-1, have voltage controlled in accordance with target voltage VR, and a non charging converter (converter 8-2) has its gate turned off. Thus secondary battery 6-1 is charged while converter 8-1 has upper arm element Q1B turned on.

Subsequently converter ECU 2 in step S120 determines whether the secondary battery (or power storage device) to be charged has attained a charged level (or SOC) exceeding a target level (or a target value). If secondary battery 6-1 is that to be charged, converter ECU 2 determines whether SOC1 has exceeded the target value, and until that to be charged attains a charged level exceeding the target level (NO at S120) step S110 is performed to continue the charging operation.

If that to be charged has attained a charged level exceeding the target level (YES at S120), converter ECU 2 proceeds to step S130 to stop the step S110 charging operation. More specifically, the charging converter (e.g., converter 8-1) also has its gate once turned off.

Furthermore, converter ECU 2 proceeds to step S140 to switch that to be charged. For example, secondary battery 6-2 is now selected as that to be charged, and secondary battery 6-1 that has so far been that to be charged is now set as that to be uncharged. Target voltage VR is set similarly as done in step S110.

Subsequently, converter ECU 2 proceeds to step S150 to start an operation charging secondary battery 6-2 selected in step S140 as that to be charged. More specifically, converter ECU 2 controls the converter that now serves as a charging converter, or converter 8-2, in voltage, while the converter that is now a non charging converter, or converter 8-1, has its gate turned off.

Converter ECU 2 proceeds to step S160 to determine whether the secondary battery (or power storage device) selected in step S140 as that to be charged has attained a charged level (or SOC) exceeding the target level (or the target value). If secondary battery 6-2 is that to be charged, converter ECU 2 determines whether SOC2 has exceeded the target value, and until that to be charged attains a charged level exceeding the target level (NO at S160) step S150 is performed to continue the charging operation.

If that to be charged has attained a charged level exceeding the target level (YES at S160), converter ECU 2 proceeds to step S170 to stop the step S150 charging operation. More specifically, the charging converter (e.g., converter 8-2) also has its gate turned off, and converters 8-1, 8-2 thus have their gates turned off. A series of steps has thus ends.

Note that the target level (or target SOC value) appearing in FIG. 7 at steps S120 and S160 for a charged level of a secondary battery (or power storage device) to be charged can be set to correspond to a fully charged level. Alternatively, on the assumption that the efficient charging mode ends before each secondary battery (or power storage device) is charged to the fully charged level, the FIG. 7 series of steps may be performed a plurality of times to gradually charge each secondary battery (or power storage device) sequentially toward the fully charged level.

In doing so, steps S120 and S160 are performed with the target level gradually updated, while the FIG. 7 series of steps is repeated. More specifically, the target level is set in such a manner that it is gradually increased toward the fully charged level whenever the FIG. 7 series of steps ends so that each secondary battery (or power storage device) is selected as that to be charged a plurality of times before it is charged to the fully charged level. This can prevent secondary batteries (or power storage devices) from having charged levels (or SOCs), respectively, with a large difference therebetween if external charging (or the efficient charging mode) ends before secondary batteries 6-1, 6-2 all reach the fully charged level.

The first embodiment thus provides a power supply system operating in an efficient charging mode to cause only one of converters 8-1 and 8-2 to perform a switching operation and thus charge a secondary battery (or power storage device). This allows converters to provide an electric power loss smaller than when each converter is switched, similarly as done in a normal operation, to charge secondary batteries (or power storage devices). Accordingly, applying the efficient charging mode for example to an external charging mode consuming a relatively long period of time allows a power storage device to enhance a charge efficiency.

First Embodiment in Exemplary Variation

Figure 8:
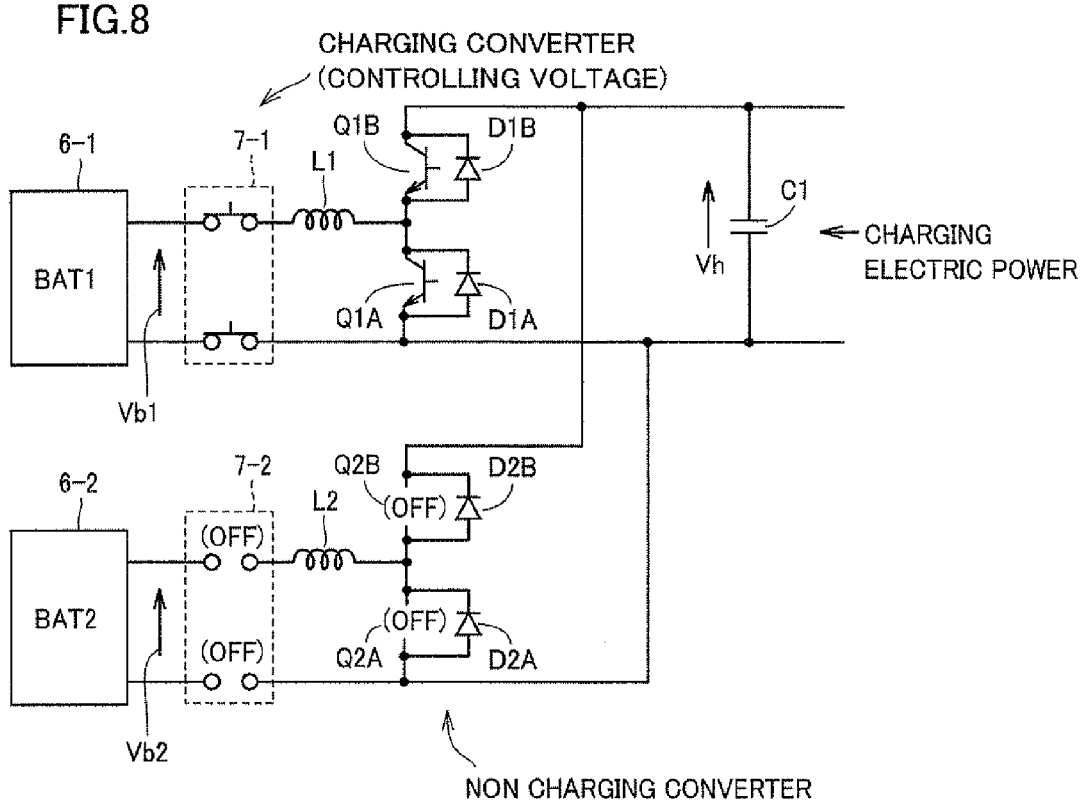
FIG. 8 is a conceptual diagram for illustrating how a converter is controlled in the power supply system in an efficient charging mode according to the first embodiment in an exemplary variation.

FIG. 8 is a conceptual diagram for illustrating a control operation in the power supply system in an efficient charging mode according to the first embodiment of the present invention in an exemplary variation.

The first embodiment in the exemplary variation provides power supply system 101 and electric powered vehicle 100 having the system mounted thereon that are similar in configuration to the first embodiment, except that in the aforementioned efficient charging mode, converters are controlled in a manner different than the first embodiment.

With reference to FIG. 8, the first embodiment in the exemplary variation differs form the first embodiment in that the former provides a power supply system that in the efficient charging mode has a converter with its gate turned off, i.e., a non charging converter, with its upper and lower arm elements held off, similarly as done in the first embodiment, and in addition thereto has also turned off a relay associated with the converter. The remainder, including how a charging converter is controlled, is similar to that of the first embodiment. Accordingly it will not be described repeatedly in detail.

As shown in FIG. 8 by way of example, if secondary battery 6-1 is that to be charged, relay 7-2 connected between a non charging converter, or converter 8-2, and secondary battery 6-2 associated therewith is turned off. When that to be charged is switched to secondary battery 6-2, relay 7-1 connected between a now non charging converter, or converter 8-1, and secondary battery 6-1 is turned off.

This can physically prevent secondary batteries 6-1 and 6-2 from having a current path formed therebetween via a diode (D1B or D2B) of the upper arm of the non charging converter having its gate turned off.

Figure 9:
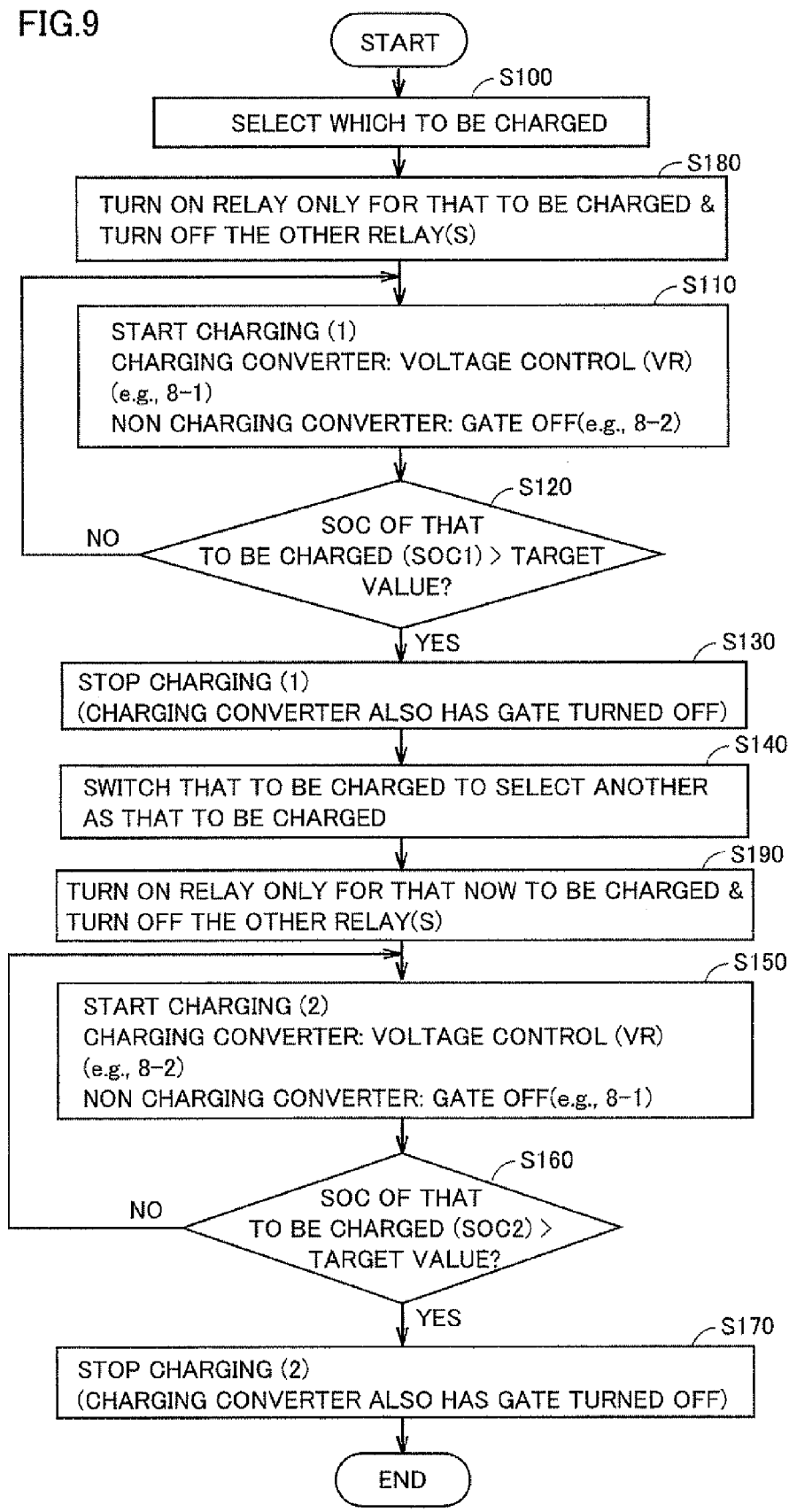
FIG. 9 is a flowchart for illustrating a series of operations in the power supply system in the efficient charging mode according to the first embodiment in the exemplary variation.

FIG. 9 is a flowchart for illustrating a series of operations in the power supply system in the efficient charging mode according to the first embodiment in the exemplary variation.

With reference to FIG. 9, the first embodiment in the exemplary variation provides an efficient charging mode different, as compared with the FIG. 7 flowchart, in that converter ECU 2 performs step S100 followed by step S180, and step S140 followed by step S190. Steps S110-S170 are similar to those in FIG. 7. Accordingly, they will not be described repeatedly in detail.

In step S100 a secondary battery (or power storage device) to be charged is selected, and converter ECU 2 proceeds to step S180 to turn on a relay associated with the secondary battery (or power storage device) to be charged, and turn off the other relay/relay(s), i.e., that/those associated with a secondary battery/batteries (or power storage device(s)) to be uncharged. For example, if secondary battery 6-1 is selected in step S100 as that to be charged, relay 7-1 will be turned on and relay 7-2 will be turned off.

Similarly, when step S140 is performed to switch the secondary battery (or power storage device) to be charged, converter ECU 2 proceeds to step S190 to turn on a relay associated with the secondary battery (or power storage device) selected in step S140 as that now to be charged, and to also turn off the other relay, i.e., that associated with the secondary battery (or power storage device) that has so far been that to be charged. For example, in place of secondary battery 6-1, secondary battery 6-2 is selected as that to be charged, and accordingly, in step S190, relay 7-1 is turned off and relay 7-2 is turned on.

The first embodiment in the exemplary variation thus provides a power supply system that can provide an effect of an efficient charging mode similarly as provided in the first embodiment, and in addition ensure that a short circuit path is not formed between secondary batteries (or power storage devices).

Second Embodiment

Hereinafter in a second and subsequent embodiments will be described successively variations of the efficient charging mode for converters 8-1, 8-2 in a power supply system similar in configuration to that described in the first embodiment. Accordingly, power supply system 101 and electric powered vehicle 100 having the system mounted therein have a configuration and provide a basic operation similarly as they do in the first embodiment. Accordingly they will not be described repeatedly. In other words, in the second and subsequent embodiments, converters 8-1, 8-2 in the efficient charging mode are controlled in an operation, as will be described hereinafter.

In the second embodiment will be described an efficient charging mode in which only a part of a plurality of converters perform a switching operation, while a plurality of power storage devices (secondary batteries) can be charged in parallel.

Figure 10:
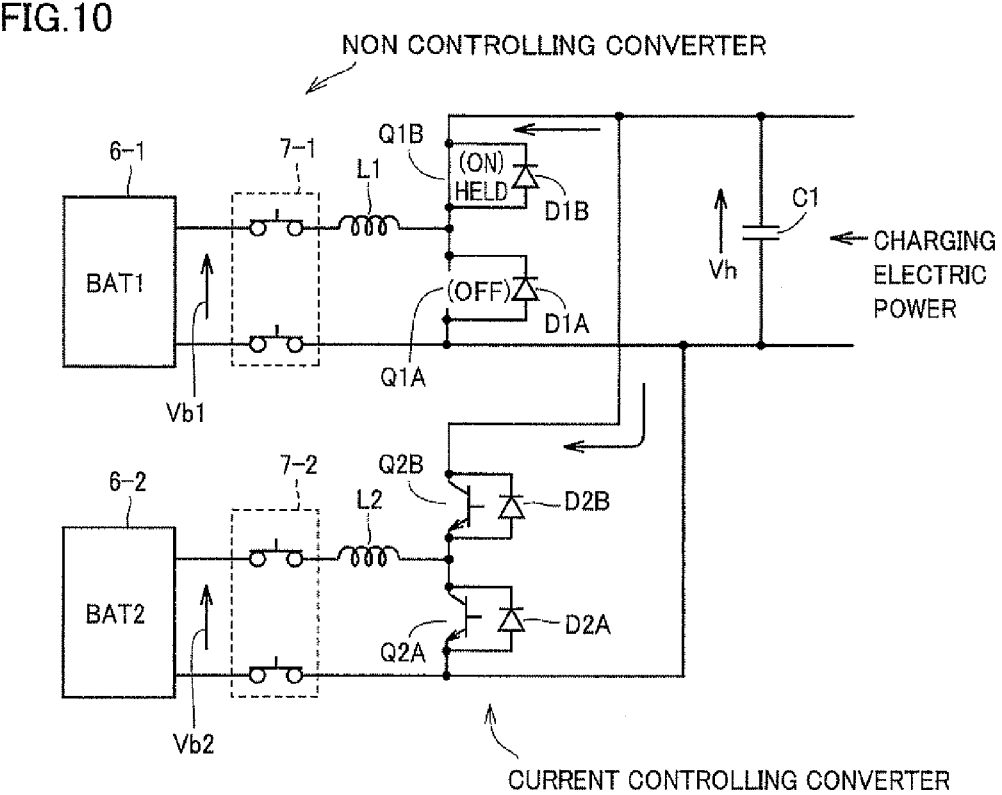
FIG. 10 is a conceptual diagram for illustrating how a converter is controlled in the power supply system in an efficient charging mode according to a second embodiment.

FIG. 10 is a conceptual diagram for illustrating how a converter is controlled in the power supply system in an efficient charging mode according to the second embodiment.

With reference to FIG. 10, the second embodiment provides a power supply system having an efficient charging mode in which converter 8-2 having its current controlled in a normal operation has its current controlled to charge secondary battery 6-2, while the remaining converter, i.e., converter 8-1, is set as a non controlling converter having upper arm element Q1B held on to charge secondary battery 6-1. In other words, the second embodiment provides an efficient charging mode allowing secondary batteries 6-1 and 6-2 to be charged in parallel.

Thus, a normal switching operation is performed in converter 8-2 (a current controlling converter), whereas converter 8-1 (a non controlling converter) does not have its switching elements turned on/off and thus does not cause a switching loss. This can reduce the converters' electric power loss to be smaller than when each converter performs a switching operation similarly as it does in the normal operation to charge secondary batteries (or power storage devices). Furthermore, converter 8-2 can control a current charging secondary battery 6-2, and to which level each secondary battery should be charged can also be adjusted.

Figure 11:
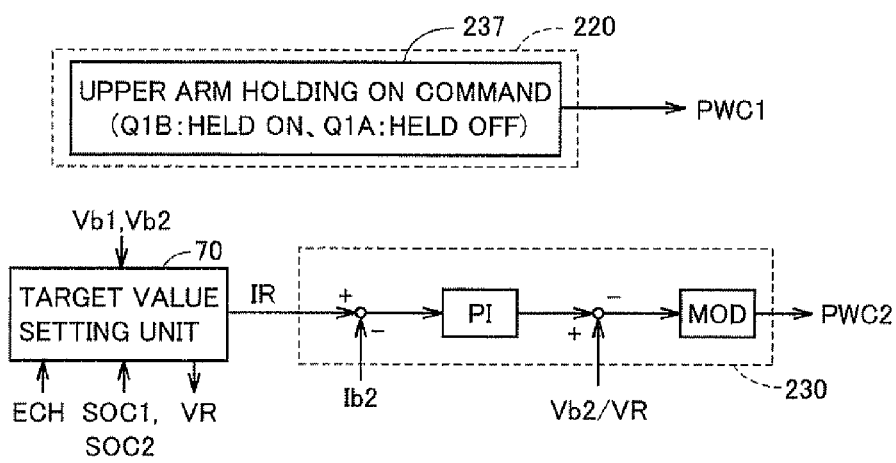
FIG. 11 is a functional block diagram for illustrating how a converter is controlled in the power supply system in the efficient charging mode according to the second embodiment.

FIG. 11 is a functional block diagram for illustrating how a converter is controlled in the power supply system in the efficient charging mode according to the second embodiment.

With reference to FIG. 11, converter 8-1 is controlled by charging control unit 220 including an upper arm holding on command unit 237. Upper arm holding on command unit 237 generates drive signal PWC1 to hold on upper arm element Q1B and hold off lower arm element Q1A.

Control unit 230 for controlling converter 8-2 is configured to be similar to current control unit 72-2 (FIG. 4) and generates drive signal PWC2 to perform a switching operation controlling current Ib2 and voltage Vh in accordance with target current IR and target voltage VR.

Note that in the efficient charging mode in the second embodiment target value setting unit 70 sets target voltage VR and target current IR in accordance with voltages Vb1, Vb2 and amounts of states SOC1, SOC2 of secondary batteries 6-1, 6-2. Target voltage VR is set at a level equivalent to the higher one of voltages Vb1 and Vb2.

Furthermore, target current IR is generated depending on amounts of states SOC1 and SOC2 to equalize SOC1 and SOC2. More specifically, If SOC2 is lower than SOC1, target current IR is set relatively high. If SOC2 is higher than SOC1, target current IR is set relatively low. In the external charging mode, charging electric power from external power supplies 90, 90# constituted by commercial power supply is known, and setting target current IR as described above allows secondary batteries 6-1, 6-2 to be charged evenly in parallel.

Thus, as shown in FIG. 10, a current controlling converter that controls a current and a non controlling converter having its upper arm element held on allow secondary batteries 6-1, 6-2 to be charged in parallel.

Figure 12:
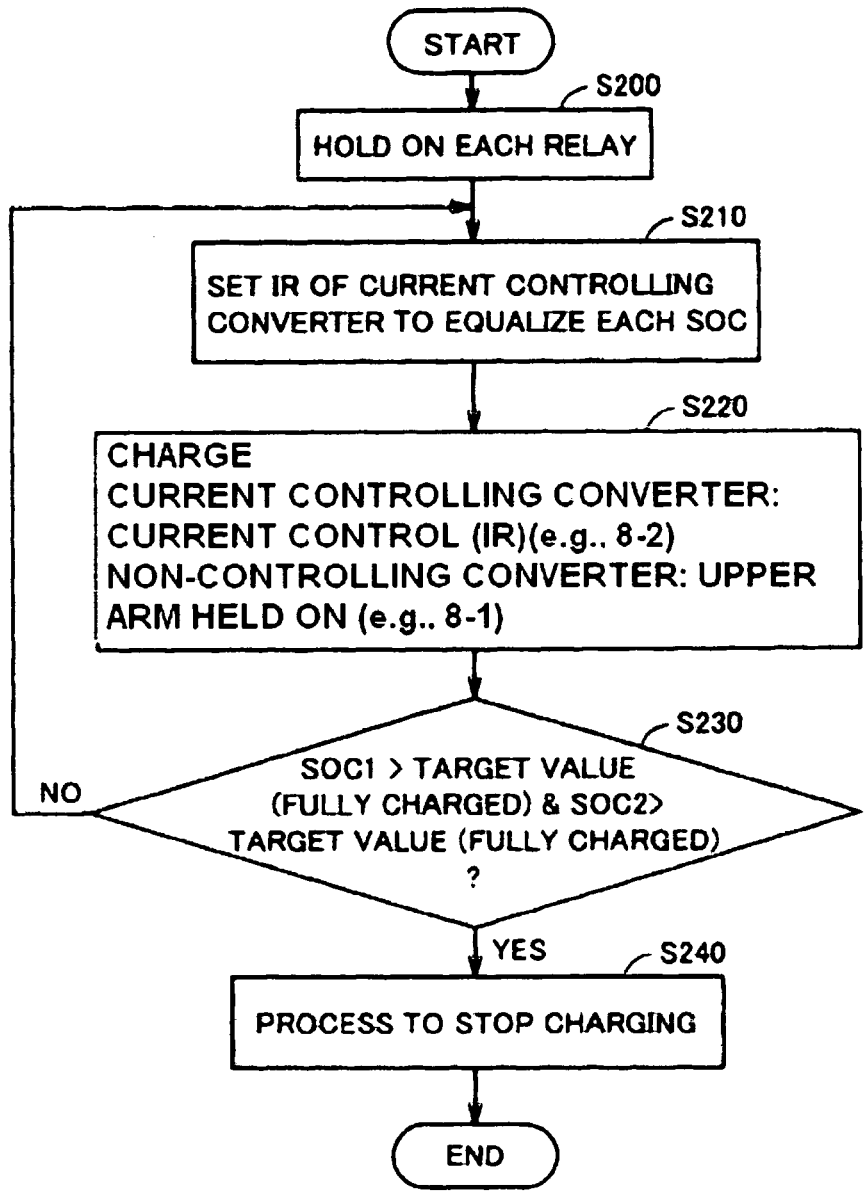
FIG. 12 is a flowchart for illustrating a series of operations in the power supply system in the efficient charging mode according to the second embodiment.

FIG. 12 is a flowchart for illustrating a series of operations in the power supply system in the efficient charging mode according to the second embodiment.

With reference to FIG. 12, once the efficient charging mode has been entered, converter ECU 2 proceeds to step S200 to hold on relays 7-1, 7-2. Converter ECU 2 then proceeds to step S210 to set target current IR for a current controlling converter (converter 8-2), as based on amounts of states SOC1, SOC2 of secondary batteries 6-1, 6-2, to allow the secondary batteries to have their respective charged levels (or SOCs) equalized.

Furthermore, converter ECU 2 proceeds to step S220 to operate the current controlling converter (converter 8-2) and a non controlling converter (converter 8-1) to start a charging operation. In step S220, the current controlling converter performs a switching operation of at least upper arm element Q2B to control a current in accordance with target current IR, while secondary battery 6-2 is charged, whereas the non controlling converter (converter 8-1) holds on upper arm element Q1B, and secondary battery 6-1 is thus charged.

Converter ECU 2 then proceeds to step S230 to determine whether secondary batteries 6-1, 6-2 charged through steps S210, S220 have been charged to the target level. More specifically, converter ECU 2 determines whether SOC1, SOC2 have both exceeded the target value. Until SOC1, SOC2 both reach the target value (NO at S230) steps S210, S220 are performed to continue the charging operation. In doing so, as SOC1 and SOC2 vary, target current IR is modified, as required, in step S210. Secondary batteries 6-1, 6-2 can thus be charged evenly and in parallel.

Once SOC1 and SOC2 have both reached the target value (YES at S230), converter ECU 2 proceeds to step S240 to perform a process stopping the charging operation. Converters 8-1, 8-2 thus have their respective gates turned off.

Thus the second embodiment provides a power supply system that allows in an efficient charging mode only one of converters 8-1, 8-2 to be switched to charge secondary batteries (or power storage devices). This can reduce the converters' electric power loss to be smaller than when each converter performs a switching operation as it does in the normal operation to charge secondary batteries (or power storage devices). Furthermore, the secondary batteries can be charged with electric power adjusted by controlling a current, while the secondary batteries (or power storage devices) can be charged in parallel. Accordingly, applying the efficient charging mode for example to an external charging mode consuming a relatively long period of time allows the power storage devices to be charged more efficiently and also be charged evenly and in parallel.

Third Embodiment

In a third embodiment will be described an efficient charging mode allowing converters to provide an electric power loss further reduced as each converter is prevented from a switching operation.

Figure 13:
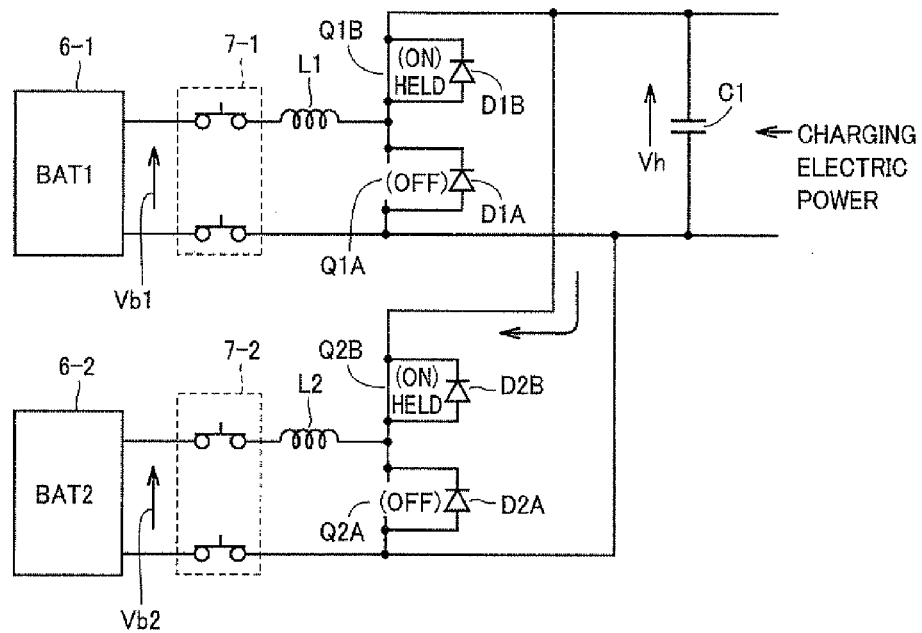
FIG. 13 is a conceptual diagram for illustrating how a converter is controlled in the power supply system in an efficient charging mode according to a third embodiment.

FIG. 13 is a conceptual diagram for illustrating how a converter is controlled in the power supply system in an efficient charging mode according to the third embodiment.

With reference to FIG. 13, the third embodiment provides a power supply system that in the efficient charging mode has converters 8-1, 8-2 with upper arm elements Q1B, Q2B held on to charge secondary batteries 6-1, 6-2. Secondary batteries 6-1, 6-2 can be charged, with converters 8-1, 8-2 each having at least one of its upper and lower arm elements prevented from turning on/off (or a switching operation), i.e., without a switching loss accompanying a switching operation.

However, as shown in FIG. 13, with converters 8-1, 8-2 having upper arm elements Q1B, Q2B concurrently turned on, if secondary batteries 6-1, 6-2 have their respective charged levels with a difference (a difference in voltage or a difference in SOC), then when they are turned on, there is a possibility that a large short circuit current Isc may be caused between secondary batteries 6-1, 6-2. Accordingly in the third embodiment the power supply system will require a charge difference adjustment operation, as will be described hereinafter, before the upper arm elements are turned on to start charging.

Figure 14:
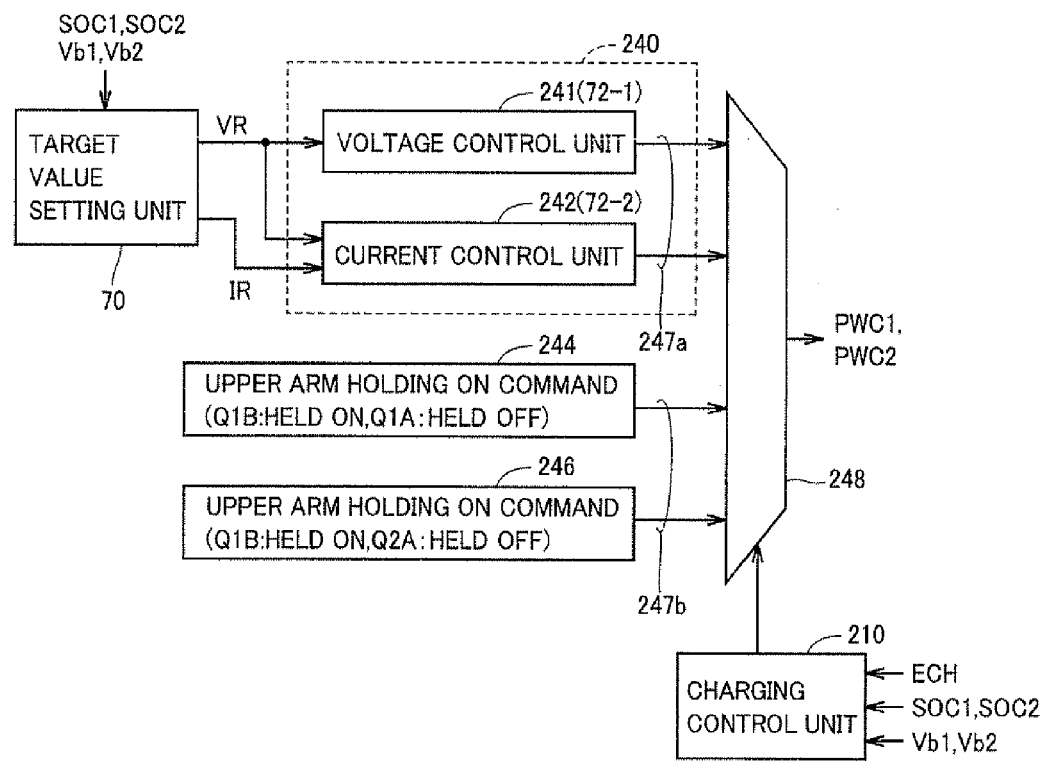
FIG. 14 is a functional block diagram for illustrating how a converter is controlled in the power supply system in the efficient charging mode according to the third embodiment.

FIG. 14 is a functional block diagram for illustrating how a converter is controlled in the power supply system in the efficient charging mode according to the third embodiment.

With reference to FIG. 14, the third embodiment provides a charge difference adjustment unit 240 including a voltage control unit 241 for generating drive signal PWC1 for converter 8-1 and a current control unit 242 for generating drive signal PWC2 for converter 8-2. Voltage control unit 241 is configured to be similar to voltage control unit 72-1 shown in FIG. 4 and current control unit 242 is configured to be similar to current control unit 72-2 shown in FIG. 4. In other words, charge difference adjustment unit 240 controls converters 8-1, 8-2 similarly as the converters are controlled in the normal operation.

Target value setting unit 70 sets target voltage VR and target current IR based on voltage control unit 241 and voltages Vb1, Vb2 and amounts of states SOC1, SOC2 of secondary batteries 6-1, 6-2 to resolve a charged level between secondary batteries 6-1 and 6-2.

Upper arm holding on command unit 244 generates drive signal PWC1 to allow converter 8-1 to have upper arm element Q1B held on and lower arm element Q1A held off. Similarly, upper arm holding on command unit 246 generates drive signal PWC2 to allow converter 8-2 to have upper arm element Q2B held on and lower arm element Q2A held off.

A selector 248 receives a set 247a of drive signals PWC1, PWC2 generated by charge difference adjustment unit 240 and a set 247b of drive signals PWC1, PWC2 generated by upper arm holding on command units 244, 246 and follows an instruction received from charging control unit 210 to select one of the sets to generate drive signals PWC1, PWC2.

Charging control unit 210 receives mode signal ECH indicating that the efficient charging mode should be entered, and voltages Vb1, Vb2 and amounts of states SOC1, SOC2 of secondary batteries 6-1, 6-2. The efficient charging mode is entered, and thereafter if secondary batteries 6-1, 6-2 have their respective charged levels with a difference (an SOC difference and an output voltage difference) larger than a predetermined value, charging control unit 210 controls selector 248 to select drive signals PWC1, PWC2 generated by charge difference adjustment unit 240. In contrast, after the efficient charging mode is entered if secondary batteries 6-1, 6-2 have their respective charged levels with a difference equal to or smaller than the predetermined value, charging control unit 210 controls selector 248 to select drive signals PWC1, PWC2 generated by upper arm holding on command units 244, 246.

Thus, as shown in FIG. 13, before charging starts, a charge difference adjustment operation can be performed, and converters 8-1, 8-2 can also each have its upper arm element held on to charge secondary batteries 6-1, 6-2.

Figure 15:
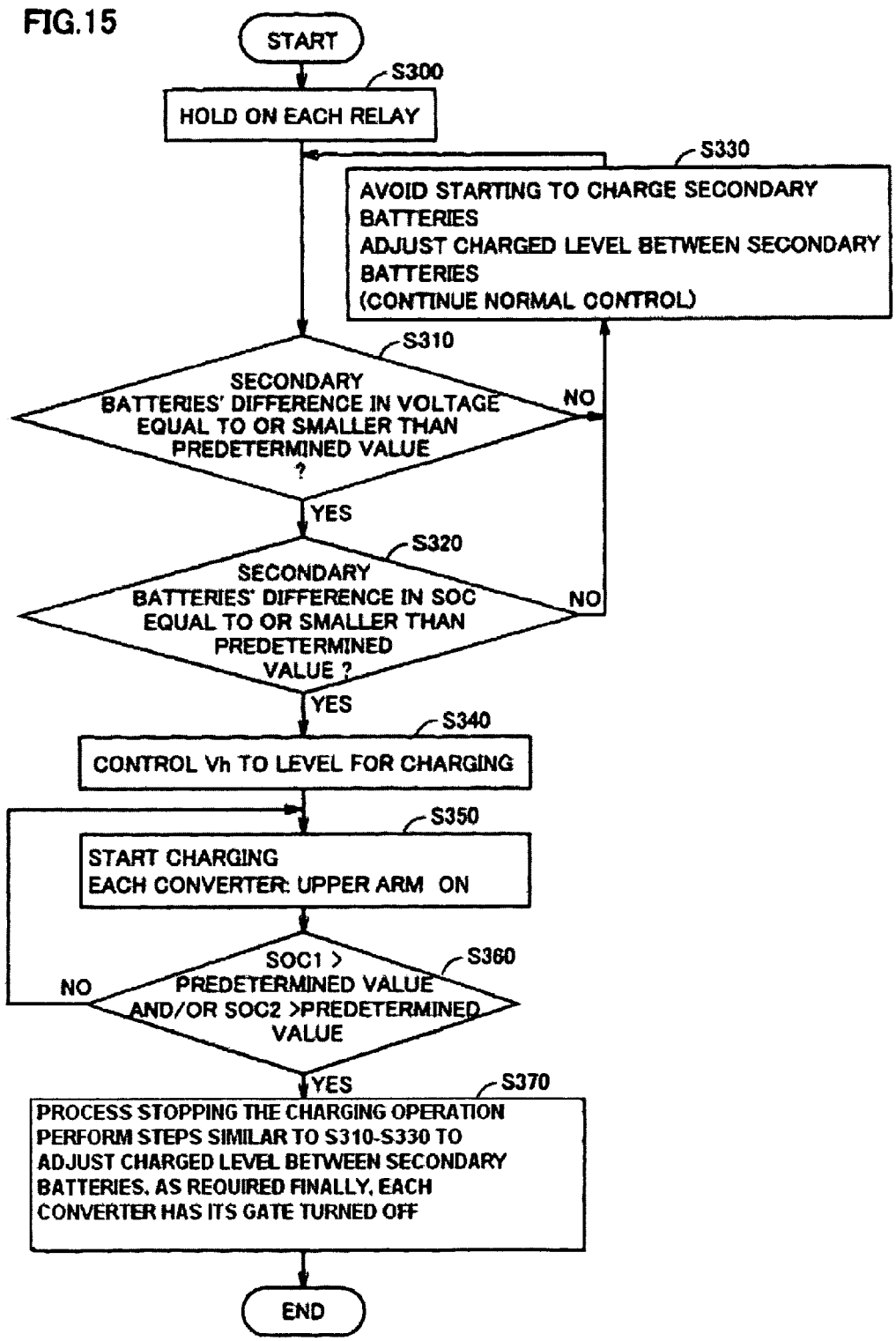
FIG. 15 is a flowchart for illustrating a series of operations in the power supply system in the efficient charging mode according to the third embodiment.

FIG. 15 is a flowchart for illustrating a series of operations in the power supply system in the efficient charging mode according to the third embodiment.

With reference to FIG. 15, once the efficient charging mode has been entered, converter ECU 2 proceeds to step S300 to hold on relays 7-1, 7-2. Converter ECU 2 proceeds to steps S310 and S320 to determine whether secondary batteries 6-1, 6-2 have their respective charged levels with a difference equal to or smaller than the predetermined value. More specifically, converter ECU 2 in step S310 determines whether secondary batteries 6-1, 6-2 have a difference in voltage (|Vb1−Vb2|) equal to or smaller than a predetermined value, and converter ECU 2 in step S320 determines whether secondary batteries 6-1, 6-2 have a difference in SOC, i.e., |SOC1−SOC2|, equal to or smaller than a predetermined value.

If at least one of steps S310 and S320 is NO, converter ECU 2 determines that the converters need to be controlled by charge difference adjustment unit 240 as shown in FIG. 10. Converter ECU 2 proceeds to step S330 to avoid starting charging and instead adjust a charged level between secondary batteries 6-1, 6-2 by continuously controlling the converters, similarly as done in the normal operation, i.e., controlling a voltage of converter 8-1 and a current of converter 8-2.

In doing so, target voltage VR and target current IR are generated based on voltages Vb1, Vb2 and SOC1, SOC2 to allow secondary batteries 6-1, 6-2 to have their respective charged levels with a reduced difference, as described above. Converters 8-1, 8-2 can thus be controlled to charge/discharge secondary batteries 6-1, 6-2 to allow them to have their respective charged levels with a difference equal to or smaller than a predetermined value.

If steps S310, S320 are both YES, i.e., if converter ECU 2 determines that secondary batteries 6-1, 6-2 have their respective charged levels with a difference equal to or smaller than the predetermined value, converter ECU 2 proceeds to step S340 to control direct current voltage Vh to have a level for charging. More specifically, target voltage VR is set at a voltage substantially equal to voltages Vb1, Vb2 to continue to control the converters similarly as done in the normal operation. In other words, in step S340, target voltage VR will be set at a level equivalent to Max (Vb1, Vb2).

If it is confirmed that voltage Vh is set at the level for charging, i.e., a voltage substantially equivalent to voltages Vb1, Vb2 in step S340, converter ECU 2 proceeds to step S350 to control converters 8-1, 8-2 to hold on upper arm elements Q1B, Q2B, and thus start charging secondary batteries 6-1, 6-2.

In doing so, voltage Vh has been controlled beforehand in step S340 to have the level for charging. This can prevent an excessive rush current caused when upper arm elements Q1B, Q2B are turned on.

Converter ECU 2 in step S360 determines whether secondary batteries 6-1, 6-2 charged through step S350 have been charged to the target level. More specifically, converter ECU 2 determines whether SOC1 and/or SOC2 have/has exceeded the target value. Until SOC1 and/or SOC2 both reach the target value (NO at S360), step S350 is performed to continue its charging operation to charge secondary batteries 6-1, 6-2 in parallel via upper arm elements Q1B, Q2B held on.

Once SOC1 and/or SOC2 have/has reached the target value (YES at S360), converter ECU 2 proceeds to step S370 to perform a process stopping the charging operation.

Note that when step S350 is performed to charge the secondary batteries, each secondary battery is charged in an uncontrolled amount. As such, when step S360 is YES, secondary batteries 6-1, 6-2 may have their respective charged levels with a difference therebetween. Accordingly, it is preferable that as part of step S370 providing the process stopping the charging operation, a process similar to steps S310-S330 be performed to finally adjust a charged level between secondary batteries 6-1, 6-2. When the process stopping the charging operation ends, each converter 8-1, 8-2 has its gate turned off.

The third embodiment thus provides a power supply system that in an efficient charging mode has converters 8-1, 8-2 each with its upper arm element held on to charge each secondary battery (or power storage device). Each converter does not have an electric power loss caused by a switching operation. Accordingly, applying the efficient charging mode for example to an external charging mode consuming a relatively long period of time allows the power storage devices to enhance a charge efficiency.

Third Embodiment in Exemplary Variation

The third embodiment in an exemplary variation will be described for an efficient charging mode in which, as described in the third embodiment, a converter is prevented from a switching operation, and each secondary battery (or power storage device) is sequentially charged to dispense with the charge difference adjustment operation performed before it is charged.

Figure 16:
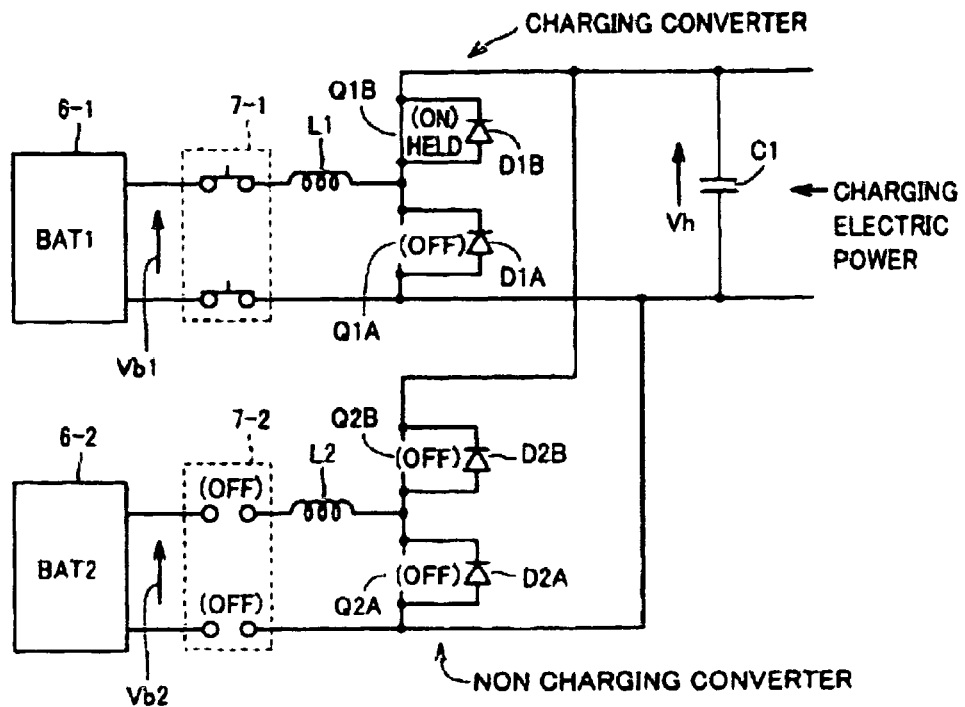
FIG. 16 is a conceptual diagram for illustrating how a converter is controlled in the power supply system in an efficient charging mode according to the third embodiment in an exemplary variation.

FIG. 16 is a conceptual diagram for illustrating how a converter is controlled in the power supply system in an efficient charging mode according to the third embodiment in an exemplary variation.

With reference to FIG. 16, the third embodiment in the exemplary variation provides a power supply system that in the efficient charging mode has a plurality of secondary batteries 6-1, 6-2 with one (a part) thereof selected as that to be charged and a secondary battery other than that to be charged is that to be uncharged, similarly as described in the first embodiment. A converter associated with the secondary battery to be charged (a charging converter) has its upper arm element held on to charge the secondary battery. In contrast, a converter associated with the secondary battery to be uncharged (a non charging converter) has its gate turned off to have its upper and lower arm elements turned off. Furthermore a relay connected to the secondary battery to be uncharged is also turned off.

In the FIG. 16 example, secondary battery 6-1 is that to be charged and secondary battery 6-2 is that to be uncharged. Accordingly, a charging converter, or converter 8-1, has upper arm element Q1B held on, and lower arm element Q1A held off. In contrast, a non charging converter, or converter 8-2, has upper arm element Q2B and Q2A held off. Furthermore, relay 7-2 is also turned off.

Thus when a charging converter has its upper arm element turned on, a short circuit current caused between secondary batteries 6-1, 6-2 can physically be prevented. This can eliminate the necessity of performing the charge difference adjustment operation before a secondary battery is charged, as described in the third embodiment. A simplified control operation can be achieved.

Figure 17:
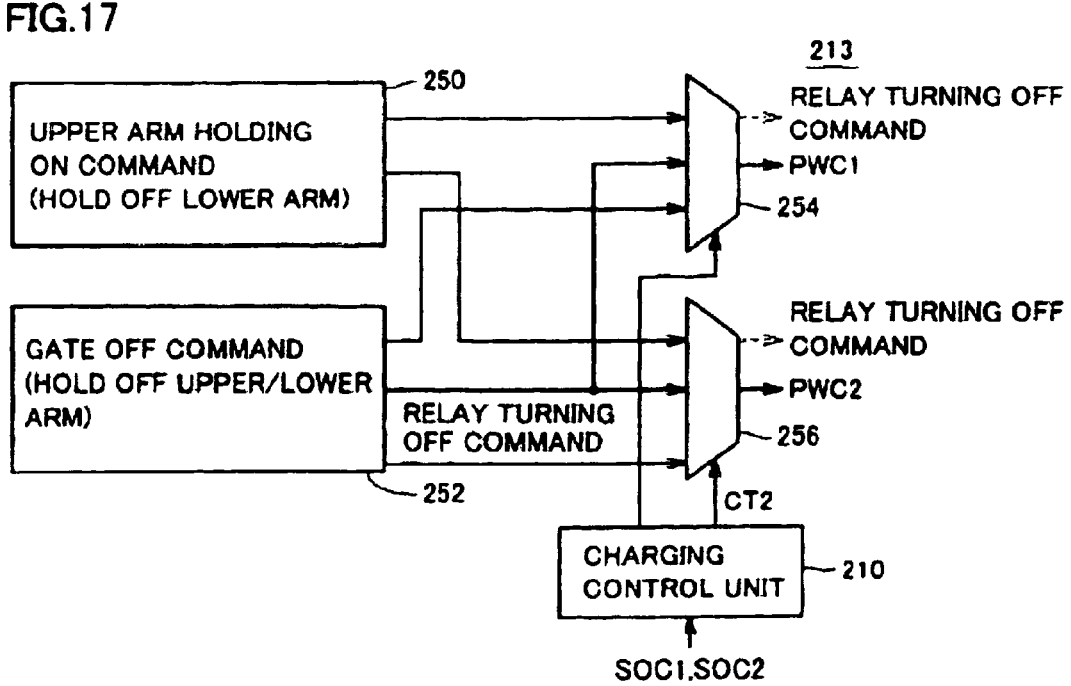
FIG. 17 is a functional block diagram for illustrating how a converter is controlled in the power supply system in the efficient charging mode according to the third embodiment in the exemplary variation.

FIG. 17 is a functional block diagram for illustrating how a converter is controlled in the power supply system in the efficient charging mode according to the third embodiment in the exemplary variation.

With reference to FIG. 17, charging control unit 210 is configured similarly as shown in FIG. 6, and receives mode signal ECH indicating the efficient charging mode and amounts of states SOC1, SOC2 of secondary batteries 6-1, 6-2 to generate control signals CT1, CT2 for selecting a secondary battery to be charged. In other words, which secondary battery should be charged is selected, and, in accordance with the selection, control signals CT1, CT2 are selectively turned on.

Upper arm holding on command unit 250 generates drive signal PWC1 to allow converter 8-1 to have upper arm element Q1B held on and lower arm element Q1A held off, and generates drive signal PWC2 to allow converter 8-2 to have upper arm element Q2B held on and lower arm element Q2A held off.

A gate off command unit 252 generates drive signal PWC1 to allow converter 8-1 to have upper arm element Q1B and lower arm element Q1A held off, and generates drive signal PWC2 to allow converter 8-2 to have upper arm element Q2B and lower arm element Q2A held off. Furthermore, gate off command unit 252 generates a relay turning off command for turning off a relay connected to the secondary battery to be uncharged.

A selector 254 receives drive signals from upper arm holding on command unit 250 and gate off command unit 252, respectively. Selector 254 is operative in response to control signal CT1 turned on to generate the drive signal that is received from upper arm holding on command unit 250 as drive signal PWC1, and is operative in response to control signal CT1 turned off to output the drive signal that is received from gate off command unit 252 as drive signal PWC1. Furthermore, selector 254 is operative in response to control signal CT1 turned off to output to relay 7-1 the relay turning off command received from gate off command unit 252.

Similarly, a selector 256 receives drive signals from upper arm holding on command unit 250 and gate off command unit 252, respectively. It is operative in response to control signal CT2 turned on to generate the drive signal that is received from upper arm holding on command unit 250 as drive signal PWC2, and is operative in response to control signal CT2 turned off to output the drive signal that is received from gate off command unit 252 as drive signal PWC2. Furthermore, selector 256 is operative in response to control signal CT2 turned off to output to relay 7-2 the relay turning off command received from gate off command unit 252.

Thus, as shown in FIG. 16, a charging converter associated with a secondary battery selected as that to be charged can have its upper arm element held on to perform a charging operation, whereas a non charging converter can have its upper and lower arm elements held off and furthermore a relay associate therewith can also be turned off.

Figure 18:
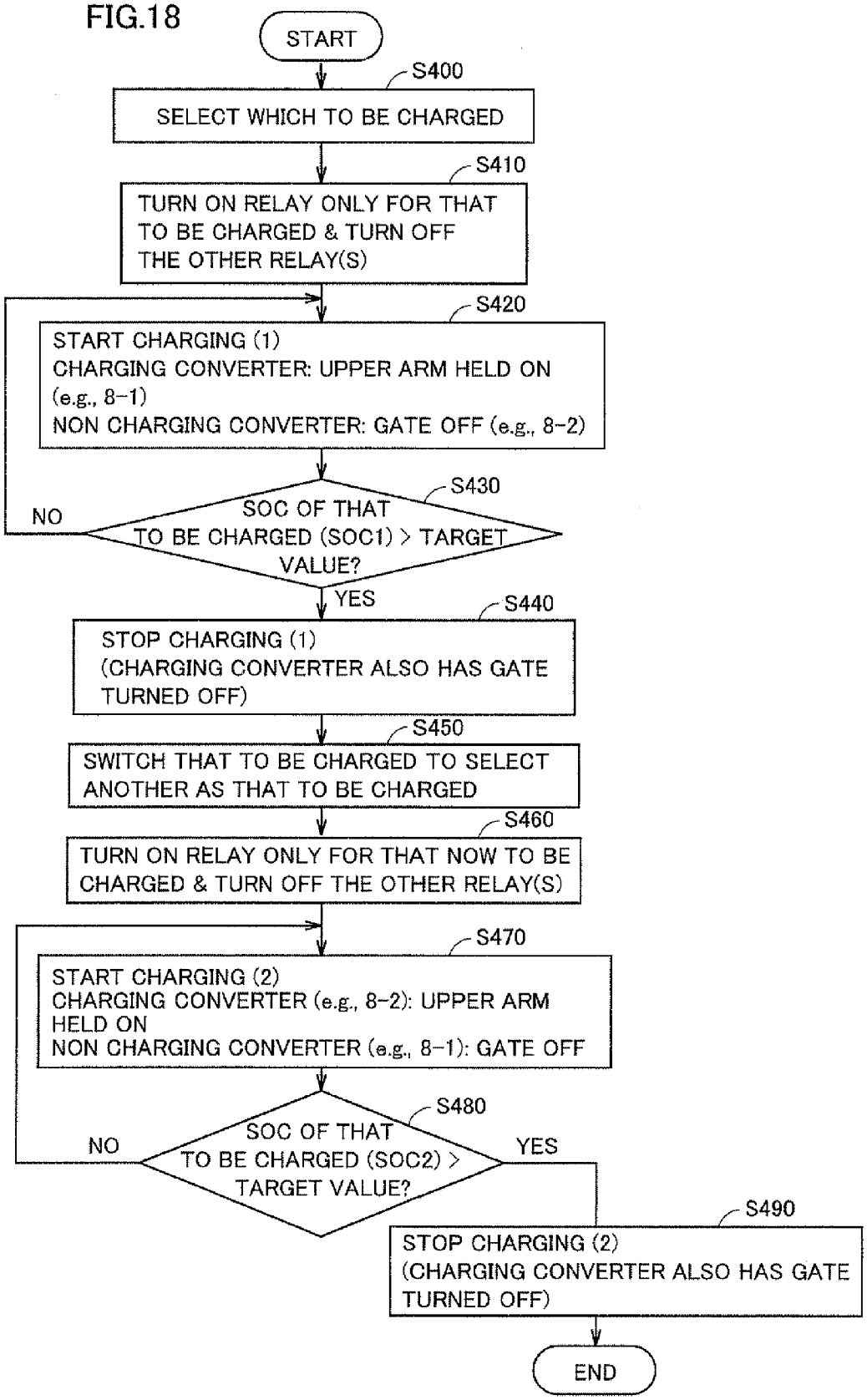
FIG. 18 is a flowchart for illustrating a series of operations in the power supply system in the efficient charging mode according to the third embodiment in the exemplary variation.

FIG. 18 is a flowchart for illustrating a series of operations in the power supply system in the efficient charging mode according to the third embodiment in the exemplary variation.

With reference to FIG. 18, converter ECU 2 in step S400 performs a step similar to the FIG. 9 S100 to select a secondary battery (or power storage device) to be charged, and in step S410 turns on a relay associated with the secondary battery (or power storage device) to be charged and turns off the other relay, i.e., that associated with a secondary battery (or power storage device) to be uncharged. For example, if in step S400 secondary battery 6-1 is selected as that to be charged, relay 7-1 is turned on whereas relay 7-2 is turned off.

Furthermore, converter ECU 2 in step S420 starts an operation charging the secondary battery (or power storage device) selected in step S400 as that to be charged. In doing so a charging converter (converter 8-1) has its upper arm element held on and the remaining, non charging converter (converter 8-2) has its gate turned off, i.e., each switching element held off.

Then converter ECU 2 in step S430 determines whether the secondary battery (or power storage device) to be charged has been charged to a level (or SOC) exceeding a target level (or target value). If secondary battery 6-1 is that to be charged, whether SOC1 has exceeded the target value is determined, and until the secondary battery to be charged is charged to a level exceeding the target level (NO at S430), step S420 is performed to continue the charging operation.

If the secondary battery to be charged is charged to a level exceeding the target level (YES at S430), converter ECU 2 proceeds to step S440 to stop the step S420 charging operation. That is, the charging converter (e.g., converter 8-1) also has its gate once turned off.

Then converter ECU 2 proceeds to step S450 to switch which to be selected as that to be charged. For example, secondary battery 6-2 is now selected as that to be charged, and that which has so far been that to be charged, i.e., secondary battery 6-1, is now that to be uncharged. Furthermore step S460 is performed to turn on a relay associated with the secondary battery selected in step S450 as that to be charged, and to also turn off the other relay, i.e., that associated with the secondary battery that has so far been that to be charged. For example, if in step S450 secondary battery 6-2 is selected as that to be charged, relay 7-2 is turned on whereas relay 7-1 is turned off. Furthermore, converter ECU 2 in step S470 starts an operation charging secondary battery 6-2 selected in step S450 as that to be charged. More specifically, a charging converter (converter 8-2) has its upper arm element held on and the remaining, non charging converter (converter 8-1) has its gate off, i.e., each switching element held off.

Then converter ECU 2 in step S480 determines whether the secondary battery (or power storage device) selected in step S450 as that to be charged has been charged to a level (or SOC) exceeding the target level (or the target value). If secondary battery 6-2 is that to be charged, whether SOC2 has exceeded the target value is determined, and until the secondary battery to be charged is charged to a level exceeding the target level (NO at S480), step S470 is performed to continue the charging operation.

If the secondary battery to be charged has been charged to a level exceeding the target level (YES at S480), converter ECU 2 proceeds to step S490 to stop the step S470 charging operation. That is, the charging converter (e.g., converter 8-2) also has its gate once turned off. A series of steps thus ends.

Note that the third embodiment in the exemplary variation also sequentially selects and thus charges secondary batteries (or power storage devices), and it is preferable that in step S430, S480 a target charged level be set similarly as done in the FIG. 7 steps S120, S160 in case the efficient charging mode ends before each secondary battery attains the fully charged level. In other words, it is preferable that the FIG. 18 control operation be repeated.

Thus the third embodiment in the exemplary variation provides a power supply system that in an efficient charging mode allows secondary batteries 6-1, 6-2 to be charged, without a switching operation of converters 8-1, 8-2, i.e., without a switching element causing a loss, similarly as described in the third embodiment.

Furthermore, a non charging converter has its gate turned off and a relay associated therewith is turned off. This ensures preventing a short circuit current flowing between secondary batteries 6-1, 6-2 when charging them starts. The charge difference adjustment operation performed before a secondary battery is charged, as described in the third embodiment, can be dispensed with, and a simplified control operation can be achieved.

Note that while the above described first to third embodiments and their exemplary variations provide a power supply system including two secondary batteries (or power storage devices) 6-1, 6-2 and converters 8-1, 8-2 associated therewith, respectively, the present invention is not limited in application to such a configuration.

Figure 19:
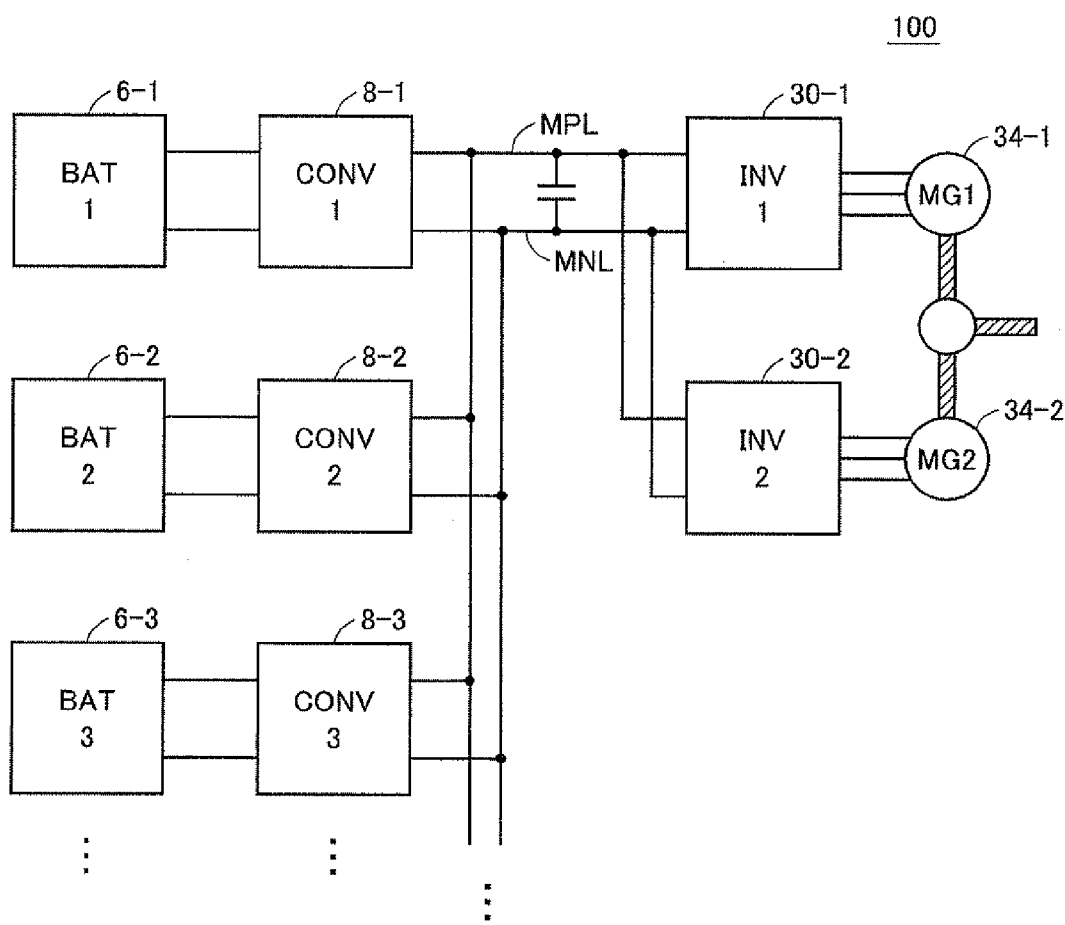
FIG. 19 is a block diagram showing how a power supply system is configured in an exemplary variation.

More specifically, as shown in FIG. 19, the first to third embodiments and their exemplary variations provide their efficient charging modes applicability in a power supply system configured to include three or more power storage devices (or secondary batteries) and three or more converters associated therewith.

Such a power supply system as thus configured includes secondary batteries 6-1, 6-2 and additionally, secondary batteries 6-3, . . . and associated converters 8-3, . . . , and controlling converters 8-3, . . . similarly as one of converters 8-1, 8-2 as has been described is controlled allows the efficient charging modes in the first to third embodiments and their exemplary variations to be applied to that power supply system. For example, in the first embodiment and its exemplary variation and the third embodiment and its exemplary variation allowing secondary batteries (or power storage devices) to be sequentially selected as that to be charged, converters 8-3, . . . are sequentially controlled as a charging converter or a non charging converter in accordance with which secondary battery (or power storage device) is selected as that to be charged. Furthermore, in the second and third embodiments allowing secondary batteries (or power storage devices) to be charged in parallel, converters 8-3, are controlled similarly as one of converters 8-1, 8-2 is controlled.

Furthermore in the above embodiments electric powered vehicle 100 may be a hybrid vehicle having mounted therein an internal combustion engine employing fuel to generate kinetic energy, an electric vehicle without having an internal combustion engine mounted therein, or a fuel cell vehicle having further mounted therein a fuel cell employing fuel to generate electrical energy.

Note that in the above description converter ECU 2 and battery ECU 4 each provide control, which is in effect executed by a central processing unit (CPU) which can be configured to read from a read only memory (ROM) a program including each steps of the flowcharts described in the embodiments and execute the read program to perform a process in accordance with the flowcharts. Accordingly, the ROM corresponds to a computer (CPU) readable storage medium having stored therein the program including each step of the flowcharts described in the embodiments.

It should be understood that the embodiments disclosed herein are illustrative and non-restrictive in any respect. The scope of the present invention is defined by the terms of the claims, rather than the above description, and is intended to include any modifications within the meaning and scope equivalent to the terms of the claims.

Industrial Applicability

The present invention is applicable to controlling charging a power supply system provided with a plurality of converters associated with a plurality of power storage devices, respectively, disposed in parallel.

The invention claimed is:

1. A power supply system for an electric powered vehicle capable of generating a driving force of said electric powered vehicle from electric power supplied on an electric power line, comprising:

a plurality of chargeable and dischargeable power storage devices;

a plurality of converters connected between said electric power line and said plurality of power storage devices, respectively, and each configured to include a plurality of power semiconductor switching elements for converting electric power between an associated power storage device of said plurality of power storage devices and said electric power line bidirectionally; and a control device for controlling turning on and off each said power semiconductor switching element of each said converter, wherein:

said plurality of power semiconductor switching elements include a first switching element electrically connected between said electric power line and said associated power storage device, said control device, in a first mode for charging said plurality of power storage devices with electric power supplied on said electric power line, periodically turns on/off each said first switching element in each of said plurality of converters to control one of a voltage of said electric power line and a current charged to said associated power storage device, and said control device, in a second mode for charging said plurality of power storage devices with electric power supplied on said electric power line for a time period longer than that of said first mode, selects at least a part of said plurality of power storage devices as that to be charged and also holds on said first switching element in said converter associated with the power storage device selected as said that to be charged, and holds off said first switching element in said converter associated with a remaining power storage device of said plurality of power storage devices other than said that to be charged, to charge said plurality of power storage devices.

2. The power supply system according to claim 1, wherein said control device in said second mode selects each of said plurality of power storage devices in parallel as those to be charged, and performs an adjustment operation for preventing a rush current caused between said power storage devices when charging said power storage devices starts, and subsequently holds on said first switching element in each said converter.

3. The power supply system according to claim 2, wherein said control device in said second mode provides said adjustment operation by having at least one of said plurality of converters control turning on/off at least one of said plurality of power semiconductor switching elements to control a voltage on said electric power line to be equivalent to a maximum voltage output from said plurality of power storage devices, and subsequently holds on said first switching element in each said converter.

4. The power supply system according to claim 2, wherein if at a point in time at which said second mode is entered said plurality of power storage devices have charged levels, respectively, with a difference therebetween larger than a predetermined value, said control device provides said adjustment operation by controlling said plurality of converters to charge/discharge said plurality of power storage devices to reduce said difference to be equal to or smaller than said predetermined value, and subsequently holds on said first switching element in each said converter.

5. The power supply system according to claim 1, further comprising a plurality of opening and closing devices provided between said plurality of converters and said plurality of power storage devices, respectively, wherein said control device in said second mode selects a part of said plurality of power storage devices sequentially as that to be charged and also holds on said first switching element in said converter associated with the power storage device selected as said that to be charged, and holds off said first switching element associated with a remaining power storage device of said plurality of power storage devices other than said that to be charged and also opens said opening and closing device.

6. A power supply system for an electric powered vehicle capable of generating a driving force of said electric powered vehicle from electric power supplied on an electric power line, comprising:

a plurality of chargeable and dischargeable power storage devices;

a plurality of converters connected between said electric power line and said plurality of power storage devices, respectively, and each configured to include a plurality of power semiconductor switching elements for converting electric power between an associated power storage device of said plurality of power storage devices and said electric power line bidirectionally; and a control device for controlling turning on and off each said power semiconductor switching element of each said converter, wherein:

said plurality of power semiconductor switching elements include a first switching element electrically connected between said electric power line and said associated power storage device, said control device, in a first mode for charging said plurality of power storage devices with electric power supplied on said electric power line, periodically turns on/off each said first switching element in each of said plurality of converters to control one of a voltage of said electric power line and a current charged to said associated power storage device, and said control device, in a second mode for charging said plurality of power storage devices to be charged with electric power supplied on said electric power line for a time period longer than that of said first mode, periodically turns on/off at least one of said plurality of power semiconductor switching elements in said converter associated with a part of said plurality of power storage devices to control a current charged to said associated power storage device to attain a target current and holds on said first switching element in said converter associated with a remaining power storage device of said plurality of power storage devices other than said part of said plurality of power storage devices, to charge said plurality of power storage devices.

7. The power supply system according to claim 6, wherein said control device sets said target current in accordance with a difference in charged level between said plurality of power storage devices.

8. A power supply system for an electric powered vehicle capable of generating a driving force of said electric powered vehicle from electric power supplied on an electric power line, comprising:

a plurality of chargeable and dischargeable power storage devices;

a plurality of converters connected between said electric power line and said plurality of power storage devices, respectively, and each configured to include a plurality of power semiconductor switching elements for converting electric power between an associated power storage device of said plurality of power storage devices and said electric power line bidirectionally; and a plurality of opening and closing devices provided between said plurality of converters and said plurality of power storage devices, respectively; and a control device for controlling turning on and off each said power semiconductor switching element of each said converter, wherein:

said plurality of power semiconductor switching elements include a first switching element electrically connected between said electric power line and said associated power storage device, said control device, in a first mode for charging said plurality of power storage devices with electric power supplied on said electric power line, periodically turns on/off each said first switching element in each of said plurality of converters to control one of a voltage of said electric power line and a current charged to said associated power storage device, and said control device, in a second mode for charging said plurality of power storage devices with electric power supplied on said electric power line for a time period longer than that of said first mode, selects a part of said plurality of power storage devices sequentially as that to be charged and also periodically turns on/off at least one of said plurality of power semiconductor switching elements in said converter associated with said power storage device selected as said that to be charged to control a voltage on said electric power line to attain a target voltage, and holds off said first switching element in said converter associated with a remaining power storage device of said plurality of power storage devices other than said that to be charged, to charge said plurality of power storage devices, and said control device in said second mode opens each said opening and closing device associated with said power storage device other than said that to be charged.

9. The power supply system according to claim 8, wherein said control device sets said target voltage to be higher than a maximum voltage of output voltages of said plurality of power storage devices.

10. The power supply system according to claim 5, wherein:

said control device is operative in response to said power storage device serving as said that to be charged having been charged to a target level to switch said that to be charged to select another power storage device as that to be charged; and said target level is set to allow each said power storage device to be selected as said that to be charged a plurality of times before each said power storage device is charged to a fully charged level.

11. The power supply system according to claim 1, wherein in said second mode said electric power line receives charging electric power originating in electric power supplied from a power supply external to said electric powered vehicle.

12. An electric powered vehicle comprising:

the power supply system according to claim 1;

a first alternating current rotating electric machine including a star-connected, first multiphase winding as a stator winding;

a second alternating current rotating electric machine including a star-connected, second multiphase winding as a stator winding;

a first inverter connected to said first multiphase winding to convert electric power between said first alternating current rotating electric machine and said electric power line;

a second inverter connected to said second multiphase winding to convert electric power between said second alternating current rotating electric machine and said electric power line;

a connector unit for electrically connecting a first neutral point of said first multiphase winding and a second neutral point of said second multiphase winding and an alternate current power supply external to said electric powered vehicle in said second mode; and an inverter control device controlling turning on and off power semiconductor switching elements of said first and second inverters, wherein:

at least one of said first and second alternating current rotating electric machines is employed to generate said driving force of said electric powered vehicle, and said inverter control device in said second mode controls each of said first and second inverters to convert alternate current voltage supplied from said alternate current power supply through said connector unit to said first and second neutral points to direct current voltage and output said direct current voltage on said electric power line.

13. A method for controlling a power supply system for an electric powered vehicle capable of generating a driving force of said electric powered vehicle from electric power supplied on an electric power line, said power supply system including: a plurality of chargeable and dischargeable power storage devices; a plurality of converters connected between said electric power line and said plurality of power storage devices, respectively, and each configured to include a plurality of power semiconductor switching elements for converting electric power between an associated power storage device of said plurality of power storage devices and said electric power line bidirectionally; and a control device for controlling turning on and off each said power semiconductor switching element of each said converter, said plurality of power semiconductor switching elements including a first switching element electrically connected between said electric power line and said associated power storage device, the method comprising the steps of:

periodically turning on/off each said first switching element in each of said plurality of converters to control one of a voltage of said electric power line and a current charged to said associated power storage device, in a first mode for charging said plurality of power storage devices with electric power supplied on said electric power line;

selecting at least a part of said plurality of power storage devices as that to be charged in a second mode for charging said plurality of power storage devices with electric power supplied on said electric power line for a time period longer than that of said first mode; and holding on said first switching element in said converter associated with said power storage device selected as said that to be charged and holding off said first switching element in said converter associated with a remaining power storage device of said plurality of power storage devices other than said that to be Charged, in said second mode.

14. The method for controlling a power supply system according to claim 13, wherein the step of selecting includes the step of selecting each of said plurality of power storage devices in said second mode in parallel as that to be charged, the method further comprising the step of performing an adjustment operation before said charging operation to prevent a rush current caused between said plurality of power storage devices when charging said power storage devices starts, and the step of holding on includes the step of holding on said first switching element in each said converter after said adjustment operation.

15. The method for controlling a power supply system according to claim 14, wherein the step of performing said adjustment operation includes the step of having at least one of said plurality of converters control turning on/off at least one of said plurality of power semiconductor switching elements to control a voltage on said electric power line to be equivalent to a maximum voltage output from said plurality of power storage devices.

16. The method for controlling a power supply system according to claim 14, wherein the step of performing said adjustment operation includes the step of controlling said plurality of converters to charge/discharge said plurality of power storage devices to reduce a difference in charged level between said plurality of power storage devices that is larger than a predetermined value to be equal to or smaller than said predetermined value.

17. The method for controlling a power supply system according to claim 13, said power supply system further including a plurality of opening and closing devices provided between said plurality of converters and said plurality of power storage devices, respectively, wherein:
   the step of selecting in said second mode selects a part of said plurality of power storage devices sequentially as that to be charged; and
   the step of holding on holds on said first switching element in said converter associated with the power storage device selected as said that to be charged, and holds off said first switching element associated with a remaining power storage device of said plurality of power storage devices other than said that to be charged and also opens said opening and closing device.

18. A method for controlling a power supply system for an electric powered vehicle capable of generating a driving force of said electric powered vehicle from electric power supplied on an electric power line, said power supply system including: a plurality of chargeable and dischargeable power storage devices; a plurality of converters connected between said electric power line and said plurality of power storage devices, respectively, and each configured to include a plurality of power semiconductor switching elements for converting electric power between an associated power storage device of said plurality of power storage devices and said electric power line bidirectionally; and a control device for controlling turning on and off each said power semiconductor switching element of each said converter, said plurality of power semiconductor switching elements including a first switching element electrically connected between said electric power line and said associated power storage device, the method comprising the step of:
   in a first mode for charging said plurality of power storage devices with electric power supplied on said electric power line, periodically turning on/off each said first switching element in each of said plurality of converters to control one of a voltage of said electric power line and a current charged to said associated power storage device; and
   in a second mode for charging said plurality of power storage devices with electric power supplied on said electric power line for a time period longer than that of said first mode, periodically turning on/off at least one of said plurality of power semiconductor switching elements in said converter associated with a part of said plurality of power storage devices to control a current charged to said associated power storage device to attain a target current and holding on said first switching element in said converter associated with a remaining power storage device of said plurality of power storage devices other than said part of said plurality of power storage devices, to perform a charging operation.

19. The method for controlling a power supply system according to claim 18, further comprising the step of setting said target current in said charging operation in accordance with a difference in charged level between said plurality of power storage devices.

20. A method for controlling a power supply system for an electric powered vehicle capable of generating a driving force of said electric powered vehicle from electric power supplied on an electric power line, said power supply system including: a plurality of chargeable and dischargeable power storage devices; a plurality of converters connected between said electric power line and said plurality of power storage devices, respectively, and each configured to include a plurality of power semiconductor switching elements for converting electric power between an associated power storage device of said plurality of power storage devices and said electric power line bidirectionally; a plurality of opening and closing devices provided between said plurality of converters and said plurality of power storage devices, respectively; and a control device for controlling turning on and off each said power semiconductor switching element of each said converter, said plurality of power semiconductor switching elements including a first switching element electrically connected between said electric power line and said associated power storage device, the method comprising the steps of:
   in a first mode for charging said plurality of power storage devices with electric power supplied on said electric power line, periodically turning on/off each said first switching element in each of said plurality of converters to control one of a voltage of said electric power line and a current charged to said associated power storage device;
   selecting a part of said plurality of power storage devices sequentially as that to be charged, in a second mode for charging said plurality of power storage devices with electric power supplied on said electric power line for a time period longer than that of said first mode, periodically;
   periodically turning on/off, in said second mode, at least one of said plurality of power semiconductor switching elements in said converter associated with said power storage device selected as said that to be charged to control a voltage on said electric power line to attain a target voltage, and holding off at least said first switching element in said converter associated with a remaining power storage device of said plurality of power storage devices other than said that to be charged, to perform a charging operation; and
   opening, in said second mode, said opening and closing device associated with said remaining power storage device, before the step of turning on/off.

21. The method for controlling a power supply system according to claim 20, wherein the step of turning on/off sets said target voltage to be higher than a maximum voltage of output voltages of said plurality of power storage devices.

22. The method for controlling a power supply system according to claim 17, further comprising the steps of:
   detecting that said power storage device serving as said that to be charged has been charged to a target level; and
   switching said that to be charged to select another to be charged in response to detection done in the step of detecting, wherein in the step of detecting, said target level is set to allow each said power storage device to be selected as said that to be charged a plurality of times before each said power storage device is charged to a fully charged level.

23. The method for controlling a power supply system according to claim 13, wherein in said second mode, said electric power line receives charging electric power originating in electric power supplied from a power supply external to said electric powered vehicle.

24. The method for controlling a power supply system according to claim 13, wherein:
said electric powered vehicle further includes
a first alternating current rotating electric machine including a star-connected, first multiphase winding as a stator winding,
a second alternating current rotating electric machine including a star-connected, second multiphase winding as a stator winding,
a first inverter connected to said first multiphase winding to convert electric power between said first alternating current rotating electric machine and said electric power line,
a second inverter connected to said second multiphase winding to convert electric power between said second alternating current rotating electric machine and said electric power line,
a connector unit for electrically connecting a first neutral point of said first multiphase winding and a second neutral point of said second multiphase winding and an alternate current power supply external to said electric powered vehicle in said second mode, and
an inverter control device controlling turning on and off power semiconductor switching elements of said first and second inverters;
at least one of said first and second alternating current rotating electric machines is employed to generate said driving force of said electric powered vehicle; and
said inverter control device in said predetermined mode controls each of said first and second inverters to convert alternate current voltage supplied from said alternate current power supply through said connector unit to said first and second neutral points to direct current voltage and output said direct current voltage on said electric power line.

\* \* \* \* \*